(12) United States Patent
Motadel et al.

(10) Patent No.: US 10,137,447 B1
(45) Date of Patent: Nov. 27, 2018

(54) ERGONOMIC FLUID HANDLING TUBES

(71) Applicant: BIOTIX, INC., San Diego, CA (US)

(72) Inventors: Arta Motadel, San Diego, CA (US);
Peter Paul Blaszcak, San Diego, CA (US); Juan Martin Mendez Padilla, Tijuana (MX)

(73) Assignee: BIOTIX, Inc., San Diego, CA (US)

( * ) Notice: Subject to any disclaimer, the term of this patent is extended or adjusted under 35 U.S.C. 154(b) by 0 days.

(21) Appl. No.: 15/885,662

(22) Filed: Jan. 31, 2018

Related U.S. Application Data

(60) Provisional application No. 62/507,416, filed on May 17, 2017, provisional application No. 62/592,628, (Continued)

(51) Int. Cl.
  *B01L 99/00* (2010.01)
  *B01L 3/00* (2006.01)

(52) U.S. Cl.
  CPC ....... *B01L 3/5021* (2013.01); *B01L 2200/087* (2013.01); *B01L 2300/042* (2013.01);
  (Continued)

(58) Field of Classification Search
  None
  See application file for complete search history.

(56) References Cited

U.S. PATENT DOCUMENTS

| | | |
|---|---|---|
| 4,713,219 A | 12/1987 | Gerken et al. |
| 5,354,539 A * | 10/1994 | Hovatter ............ A61B 10/0096 215/237 |

(Continued)

FOREIGN PATENT DOCUMENTS

| | | |
|---|---|---|
| EP | 2 468 404 | 6/2012 |
| GB | 539 891 | 9/1941 |

(Continued)

OTHER PUBLICATIONS

Eppendorf North America, Eppendorf Flex-Tubes, product available at https://online-shop.eppendorf.us/US-en/Laboratory-Consumables-44512/Tubes-44515/Flex-Tubes-PF-9186.html_qa=1.107716362.929334266.1465916839&qclid-EAlalQobChMlb1slXL2QlVEJJpCh35JwPZEAQYASABEqJAzvD_BwE, page visited Mar. 5, 2018.

(Continued)

*Primary Examiner* — Kathryn Wright
(74) *Attorney, Agent, or Firm* — Grant IP, Inc.

(57) ABSTRACT

Provided herein are fluid handling tubes having a cap that includes a sealing member having interior grooves and panels. Also provided herein are fluid handling tubes having a cap that includes (i) a sealing member having a concave surface at a distal region, and (ii) a flat proximal surface. Provided also are fluid handling tubes having a cap that includes an engagement member at an edge of the cap, where the engagement member includes a surface having curvature and a taper. Also provided herein are fluid handling tubes that include a cap comprising a tube sealing member, an anterior engagement member, and one or more channels (e.g., one or more furrows or grooves) between the sealing member and the engagement member that function as a hinge or pivot. Also provided are fluid handling tubes that include (i) a cap having a sealing member that includes an annular protrusion, and (ii) a tube body having an interior surface that includes an annular recess, where the annular recess in the tube body is configured to receive the annular protrusion of the tubular sealing member of the cap.

20 Claims, 24 Drawing Sheets

Related U.S. Application Data filed on Nov. 30, 2017, provisional application No. 62/619,657, filed on Jan. 19, 2018.

(52) U.S. Cl.
CPC . *B01L 2300/043* (2013.01); *B01L 2300/0832* (2013.01); *B01L 2300/12* (2013.01)

(56) References Cited

U.S. PATENT DOCUMENTS

| | | | |
|---|---|---|---|
| 6,007,778 | A | 12/1999 | Cholewa |
| 6,669,910 | B1 | 12/2003 | Bienhaus et al. |
| 8,540,948 | B2 | 9/2013 | Loehn |
| 2003/0102323 | A1 | 6/2003 | Lohn |
| 2012/0164038 | A1 | 6/2012 | Loehn et al. |

FOREIGN PATENT DOCUMENTS

| | | |
|---|---|---|
| JP | 60-183362 | 9/1985 |
| JP | 2001-513586 | 9/2001 |
| JP | 2012-140184 | 7/2012 |
| JP | 2014-507256 | 3/2014 |
| WO | WO 2010/008737 | 1/2010 |
| WO | WO 2010/054337 | 5/2010 |

OTHER PUBLICATIONS

Simport, MicrocentriTubes, product available at http://www.simport.com/documents/MicrocentriTubesBig/WithSnapCap/t330_15Transparent.jpg, page visited Mar. 5, 2018.

Scientific Specialties Inc., SSI Bio, MCT Infographic, product available at http://www.ssibio.com/mct-inforgraphic, page visited Mar. 5, 2018.

International Search Report and Written Opinion dated on Jul. 19, 2018 for International Application No. PCT/US2018/019748, filed on Feb. 26, 2018.

\* cited by examiner

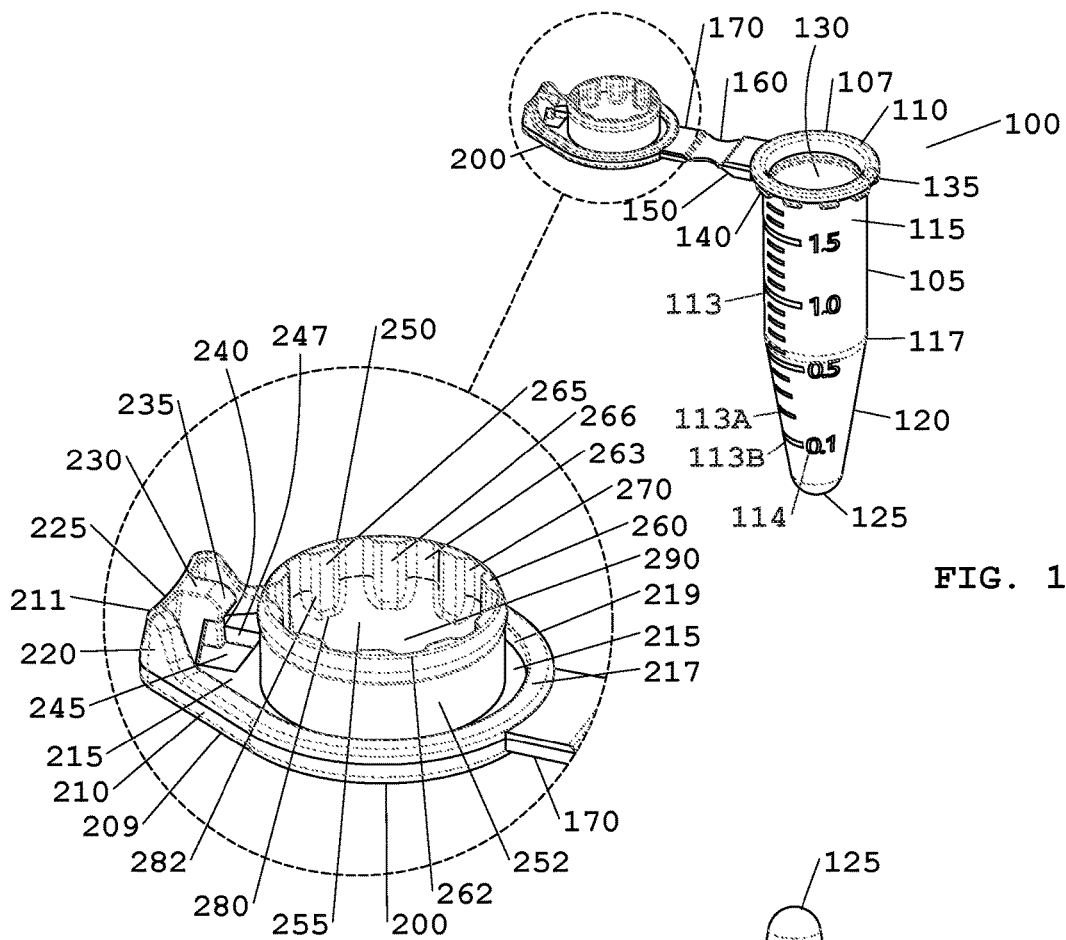
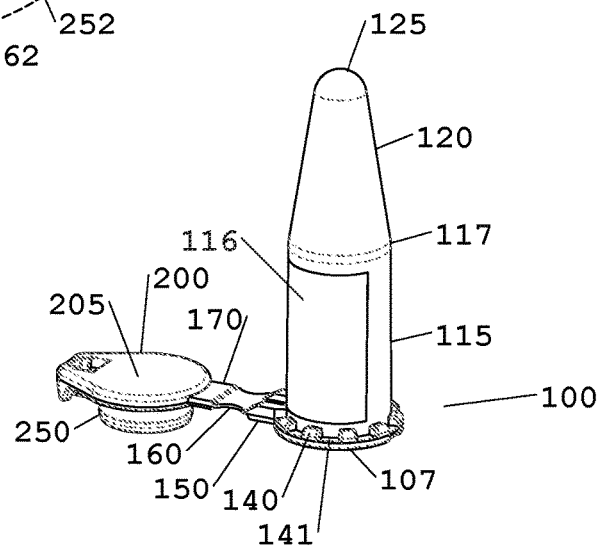
FIG. 1
FIG. 2
FIG. 3

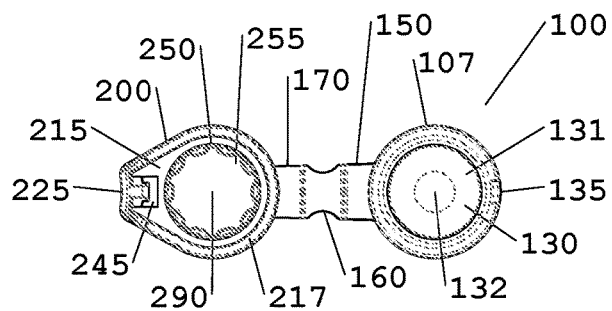
FIG. 4
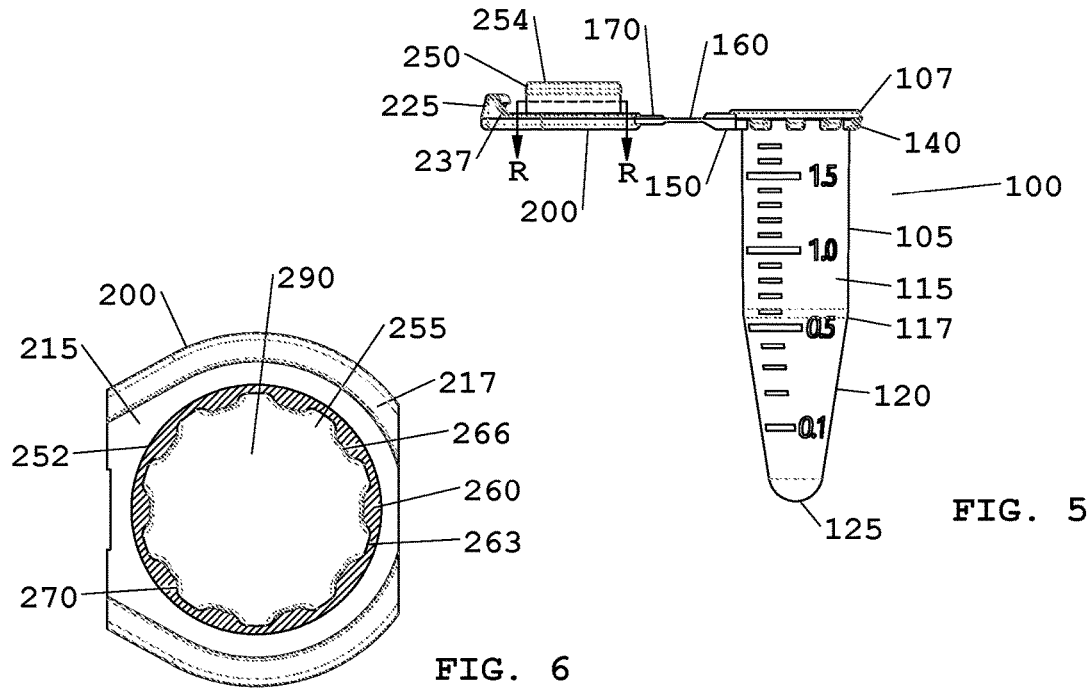
FIG. 5
FIG. 6
SECTION R-R
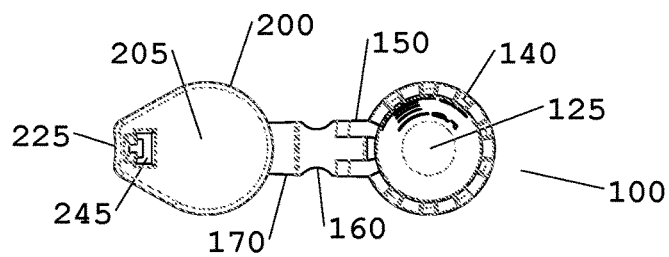
FIG. 7

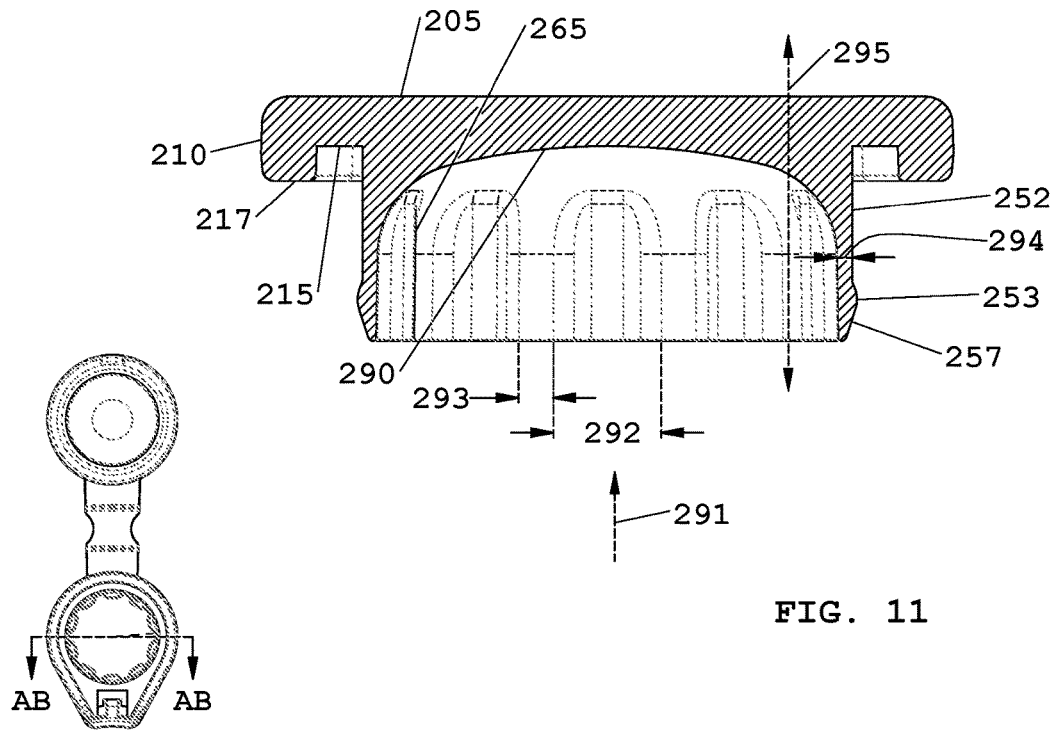
FIG. 11
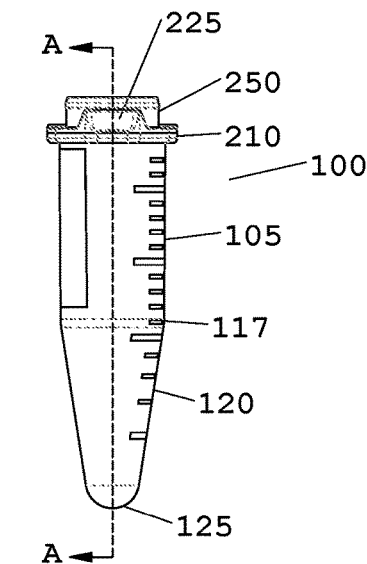
FIG. 10
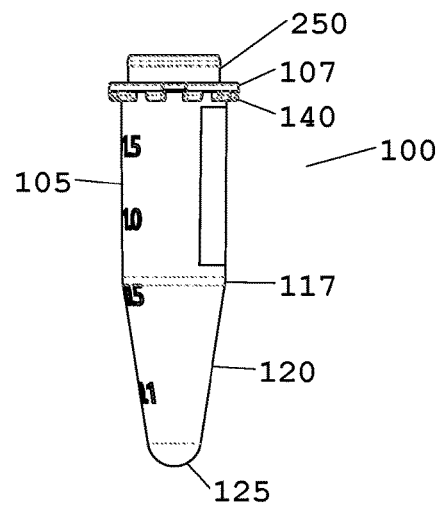
FIG. 9
FIG. 8

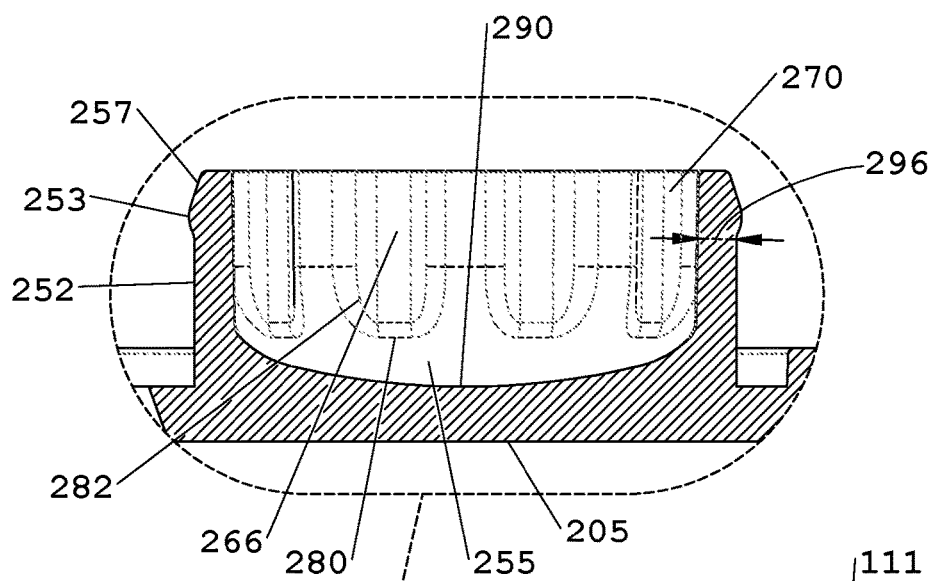
FIG. 13
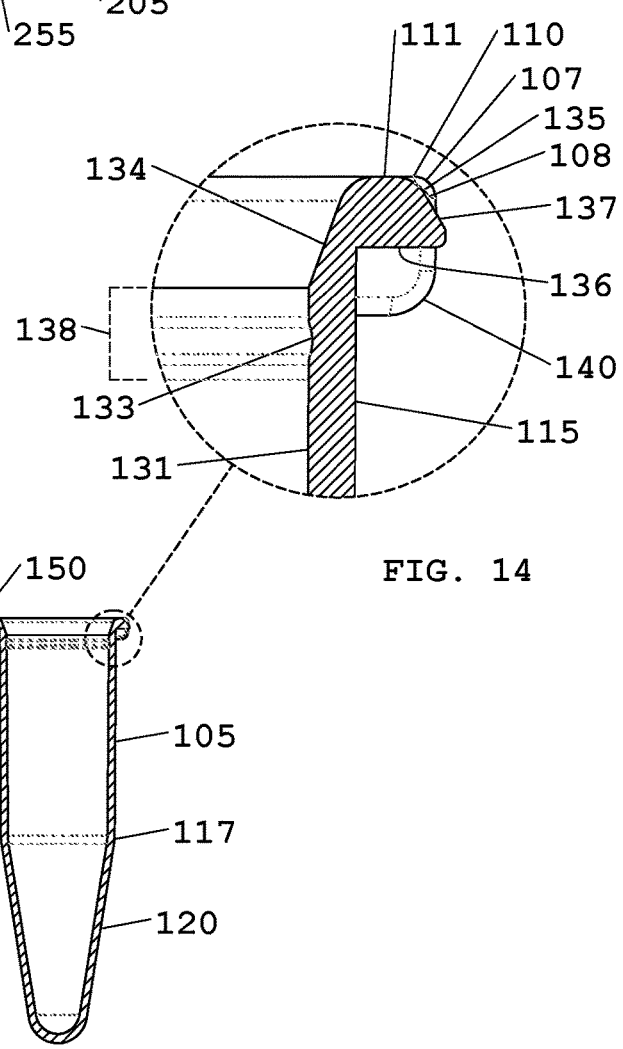
FIG. 14
FIG. 12

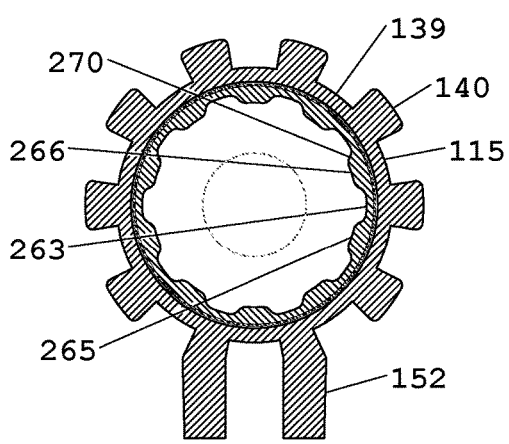
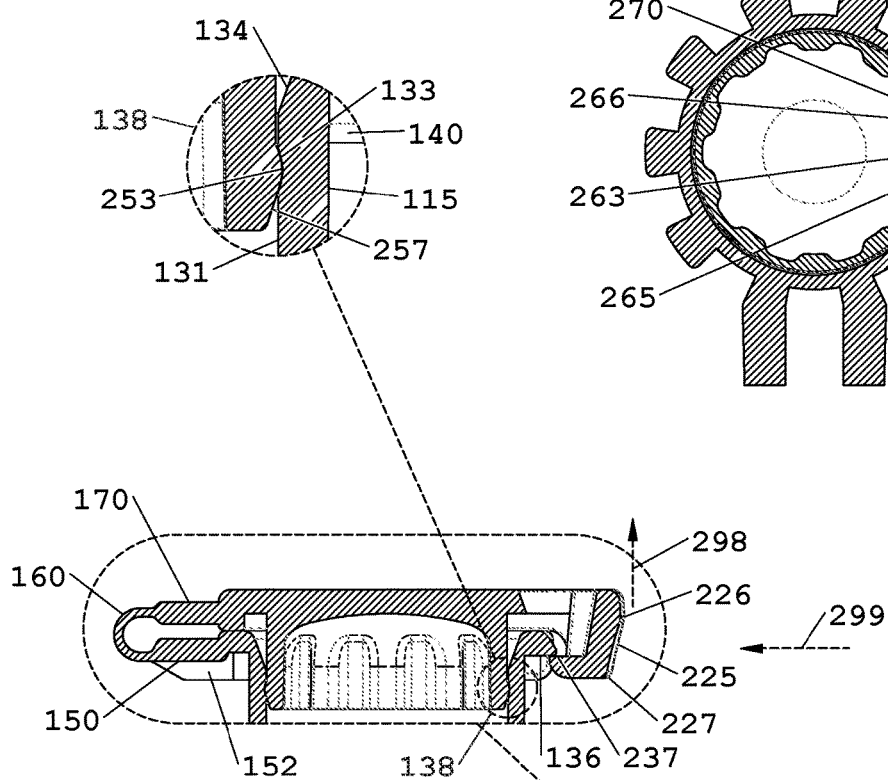
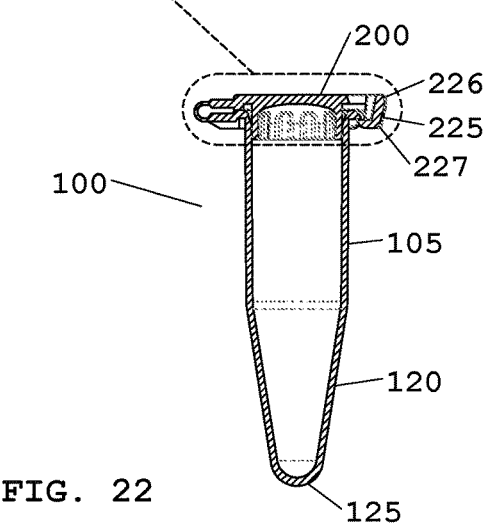

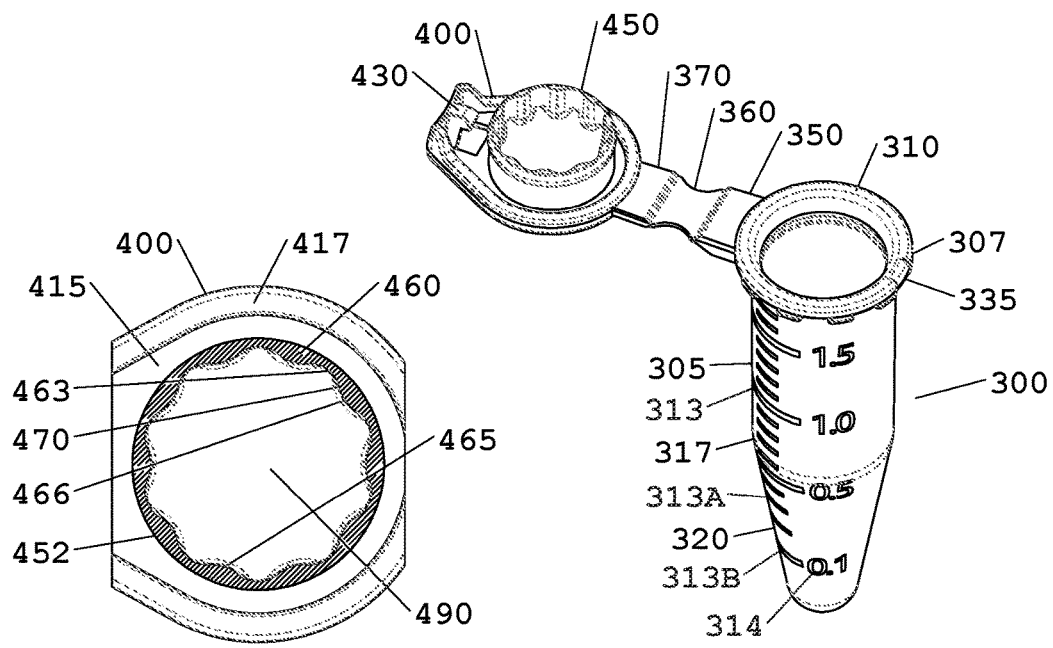
FIG. 28
FIG. 26
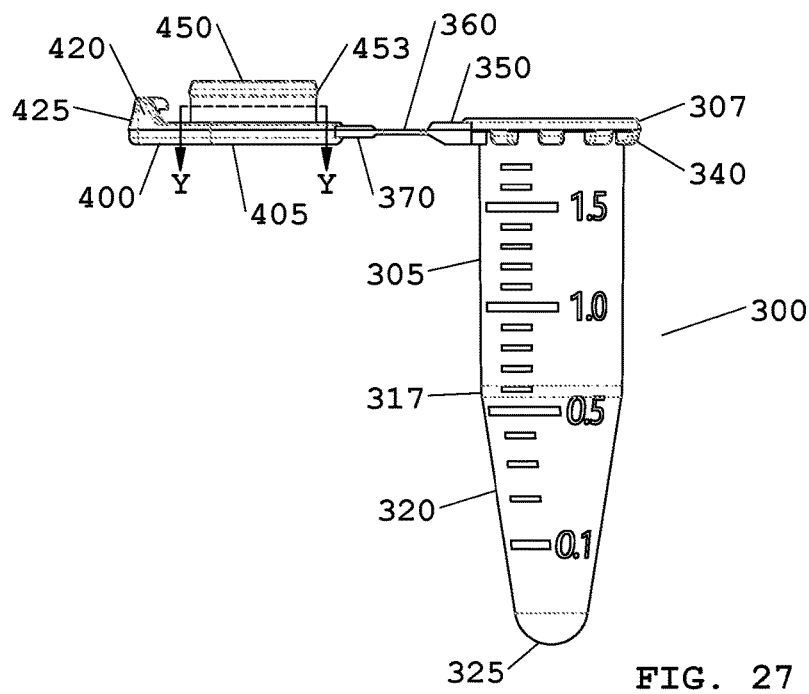
FIG. 27

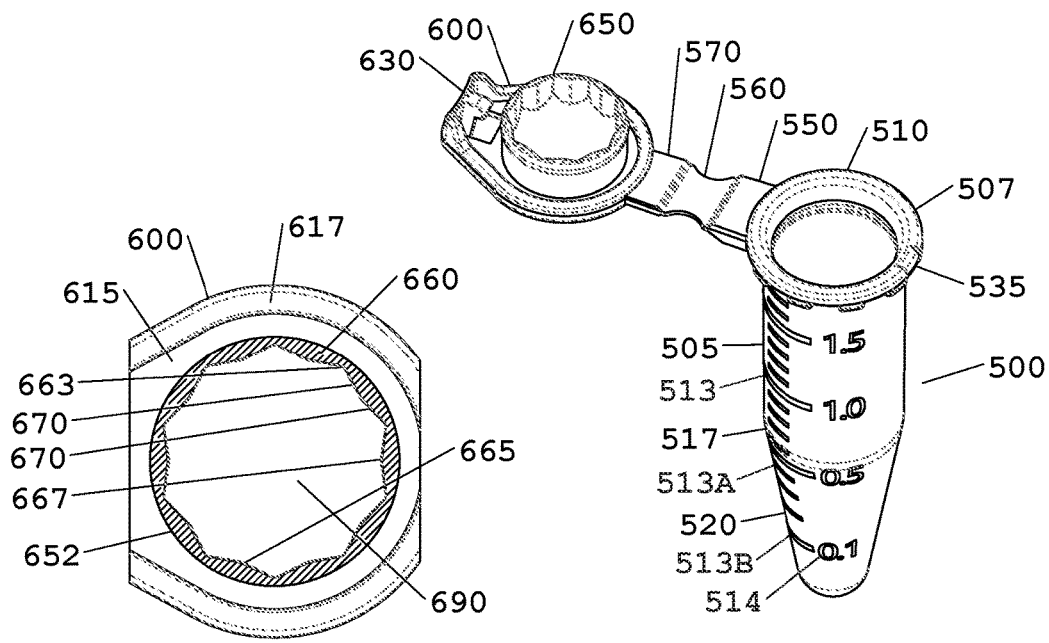
FIG. 31
FIG. 29
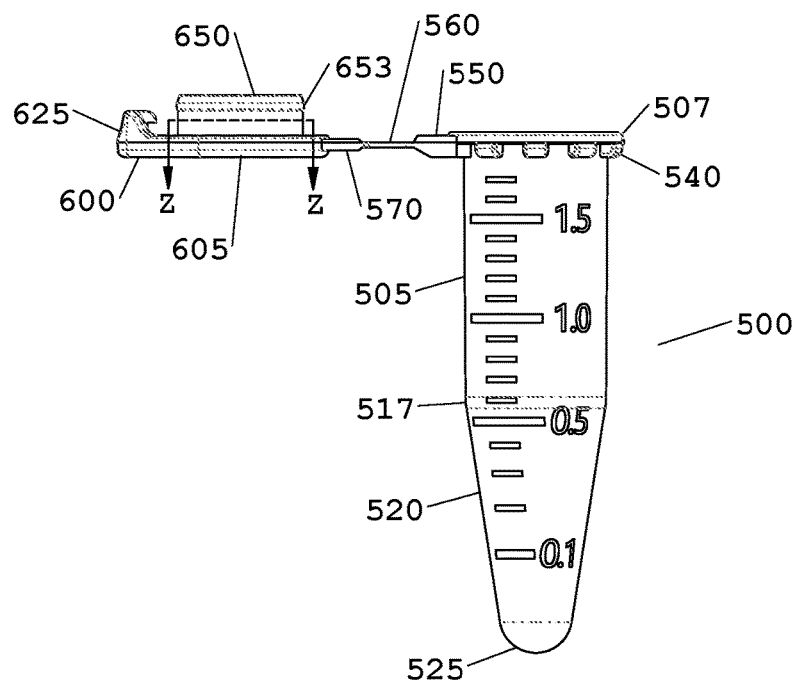
FIG. 30

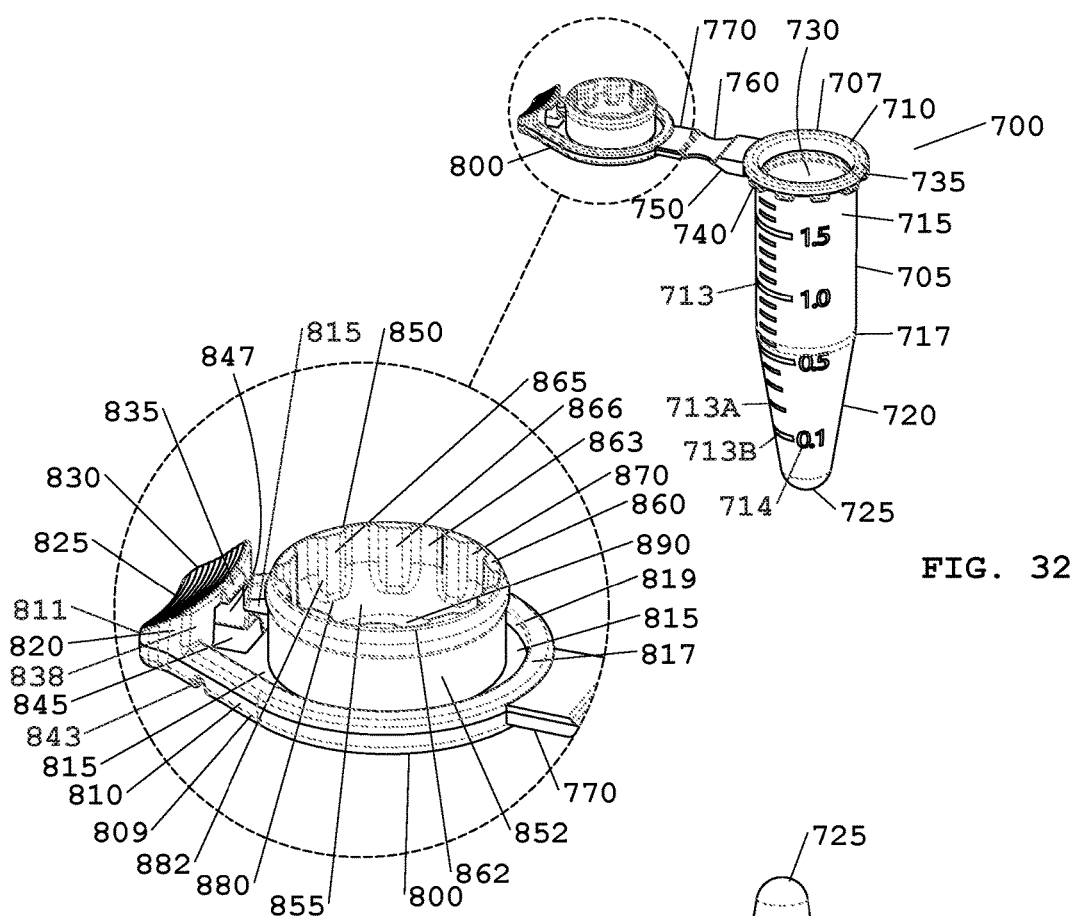
FIG. 32
FIG. 33
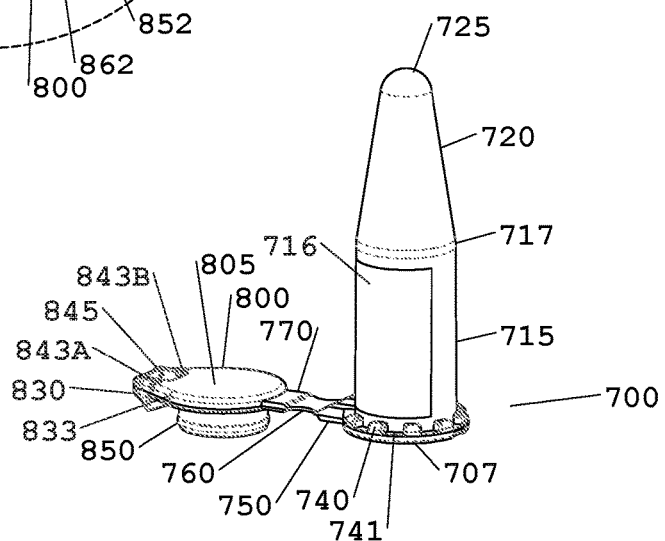
FIG. 34

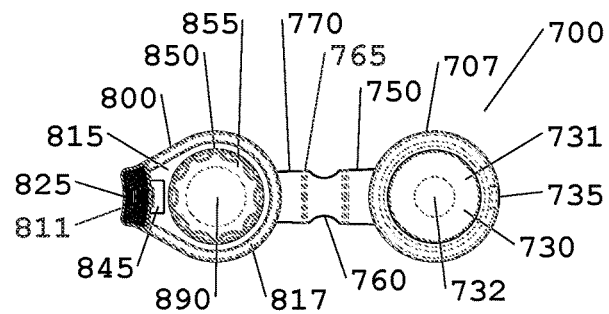
FIG. 35
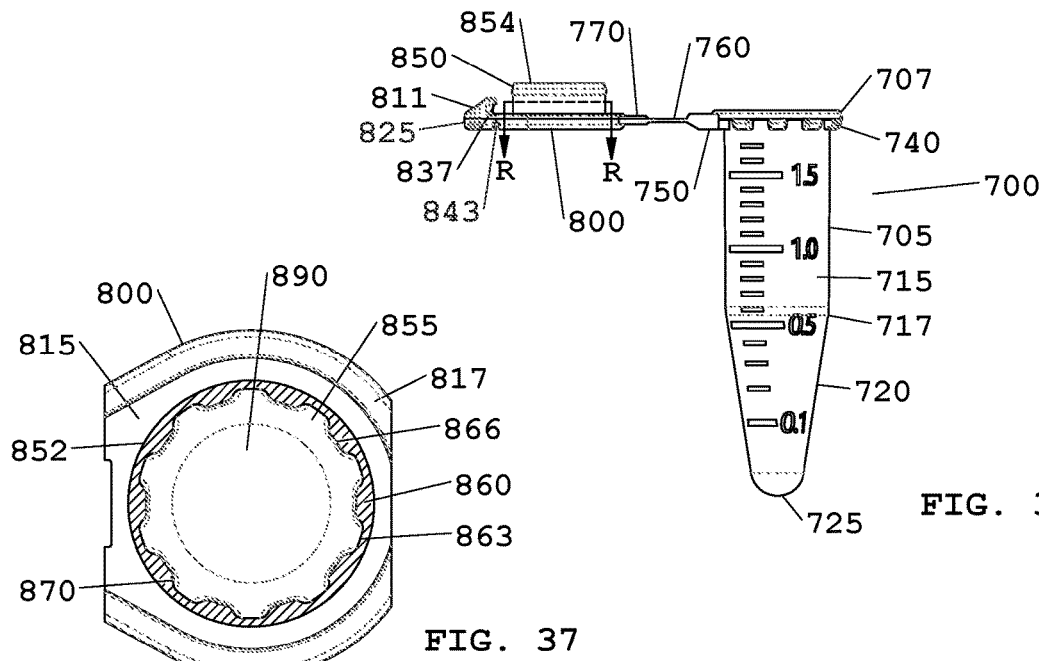
FIG. 36
FIG. 37
SECTION R-R
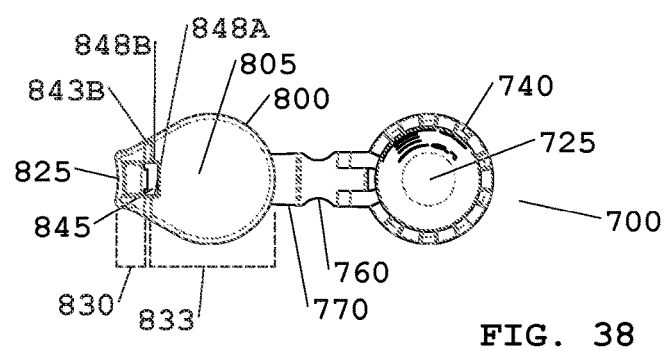
FIG. 38

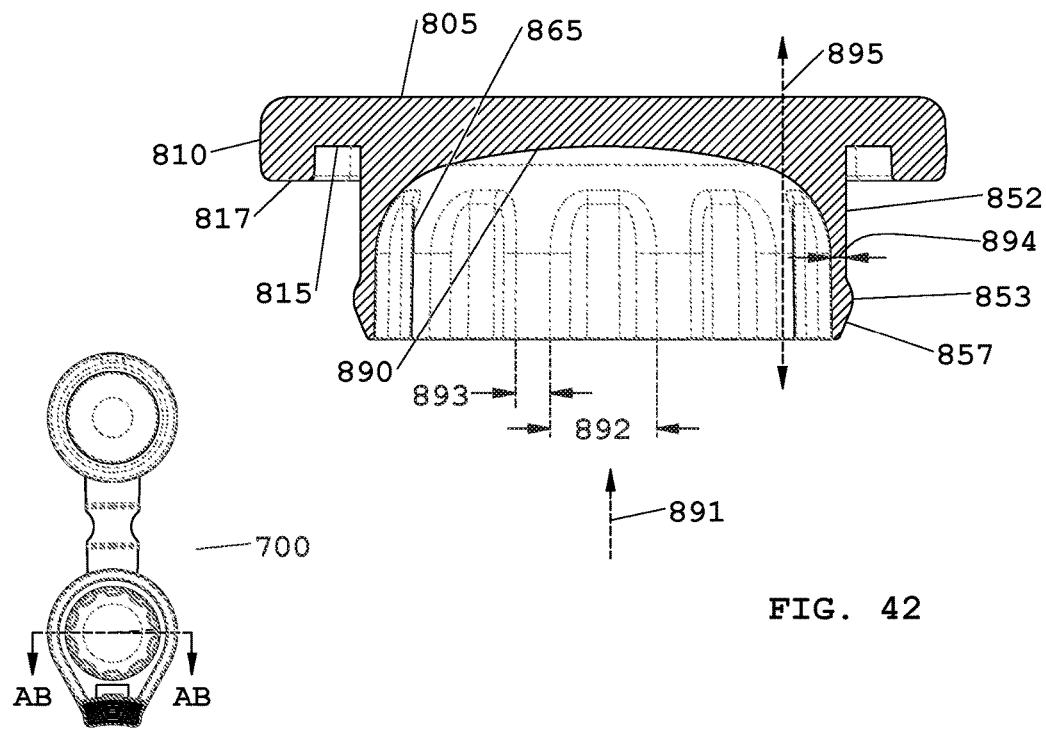
FIG. 42
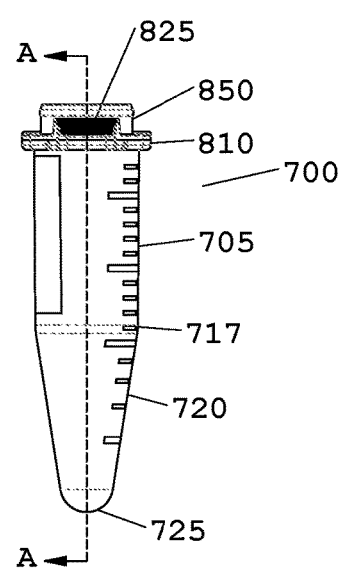
FIG. 41
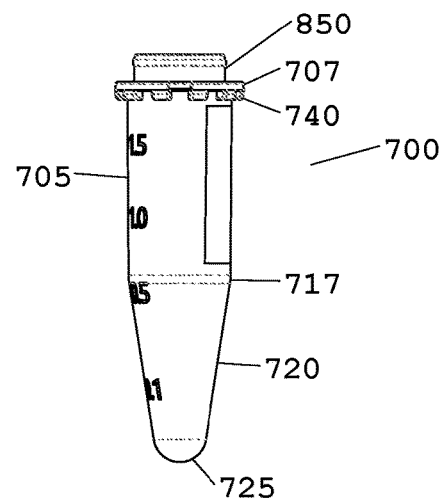
FIG. 40
FIG. 39

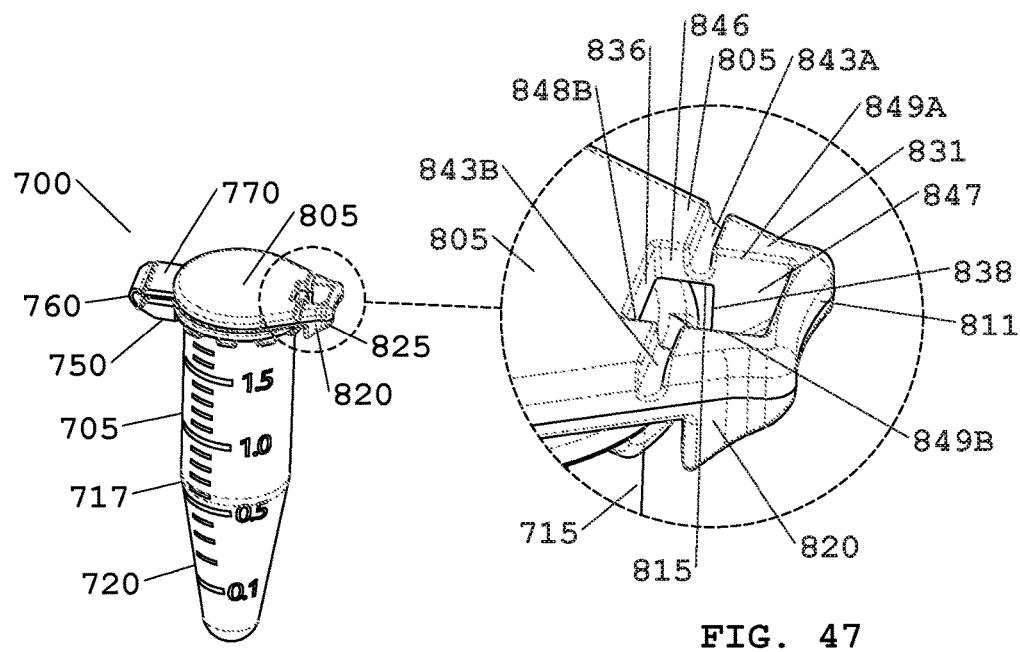
FIG. 46
FIG. 47
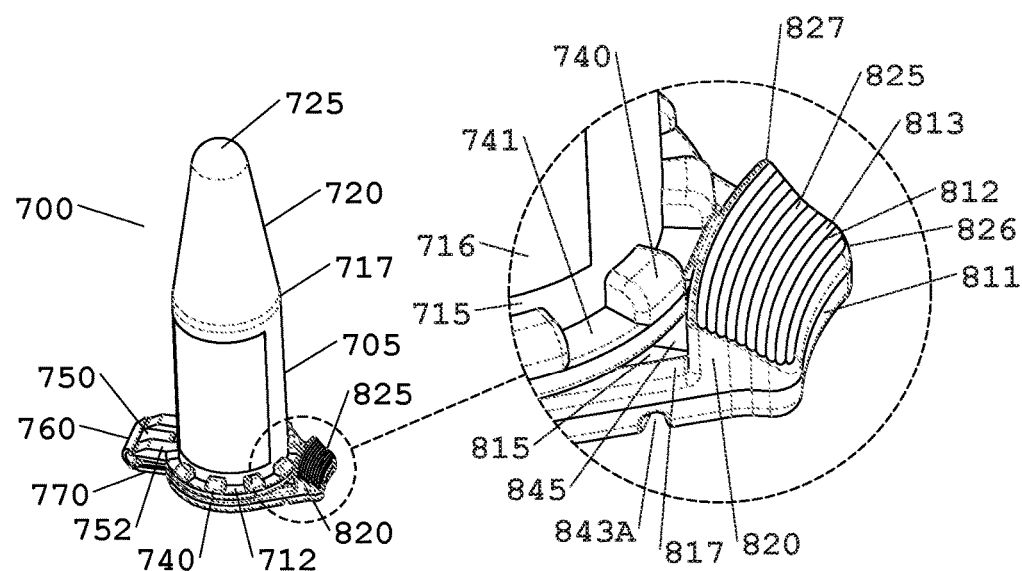
FIG. 48
FIG. 49

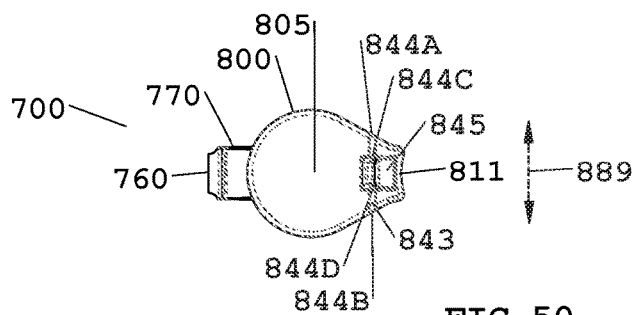
FIG.50
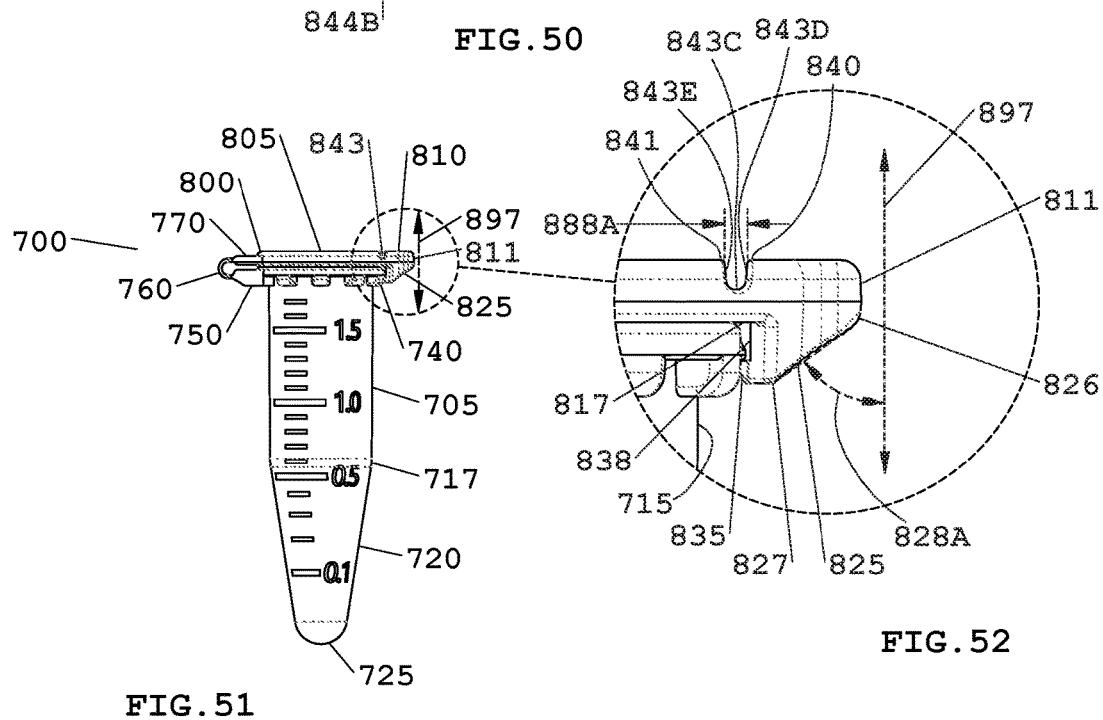
FIG.51
FIG.52
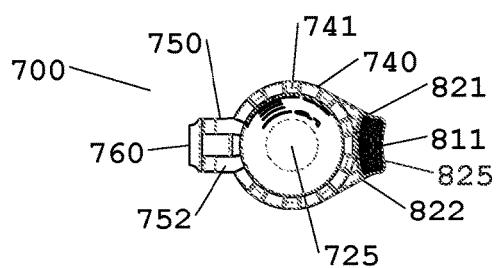
FIG.53

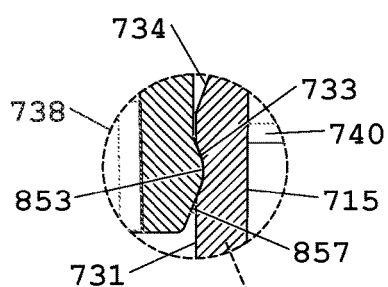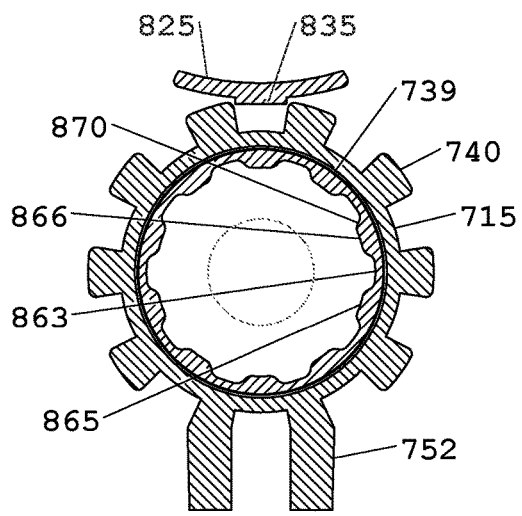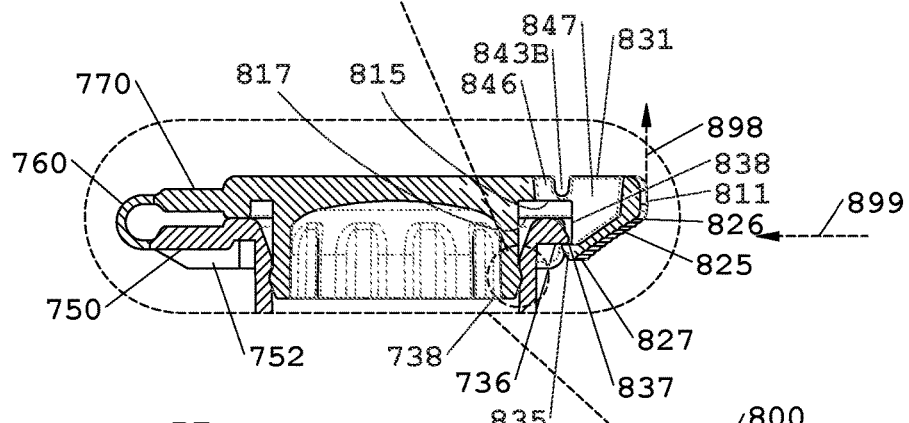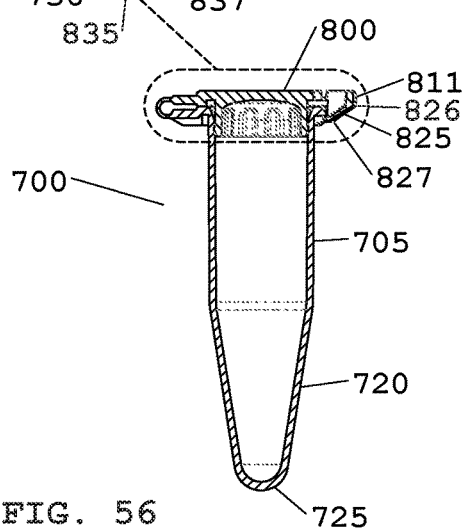

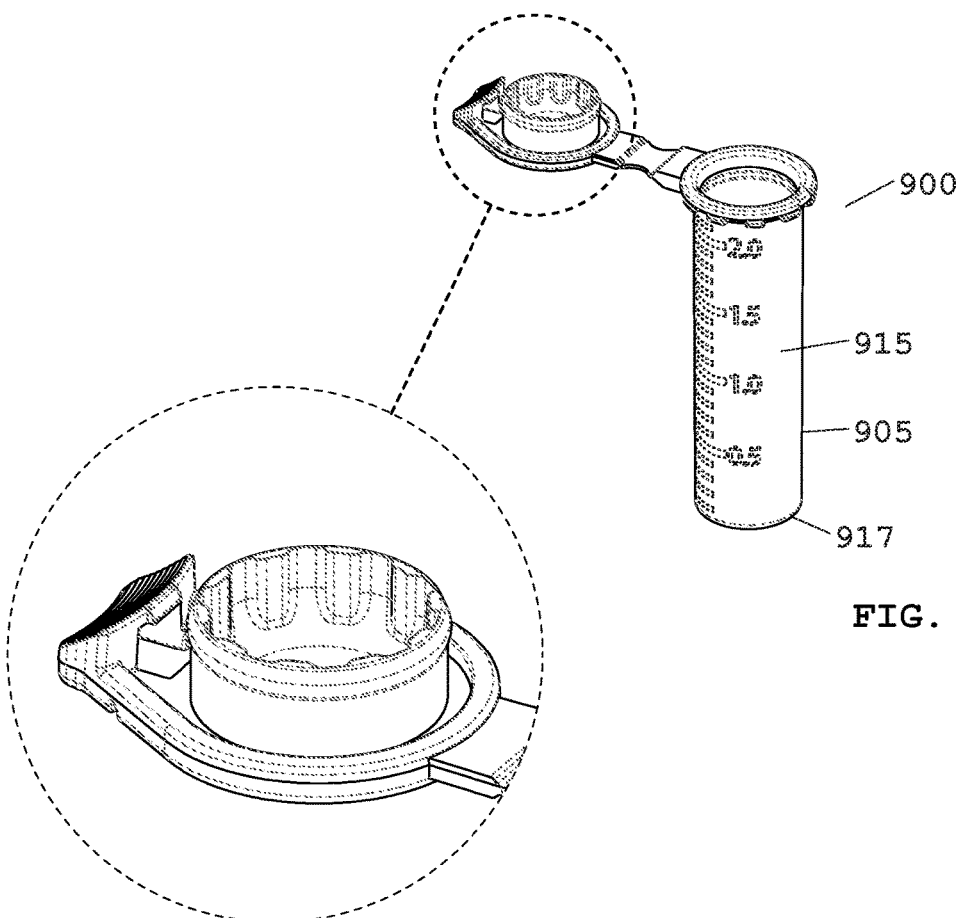
FIG. 64
FIG. 65
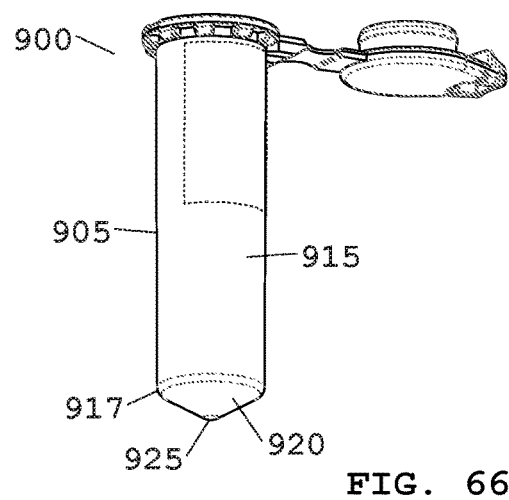
FIG. 66

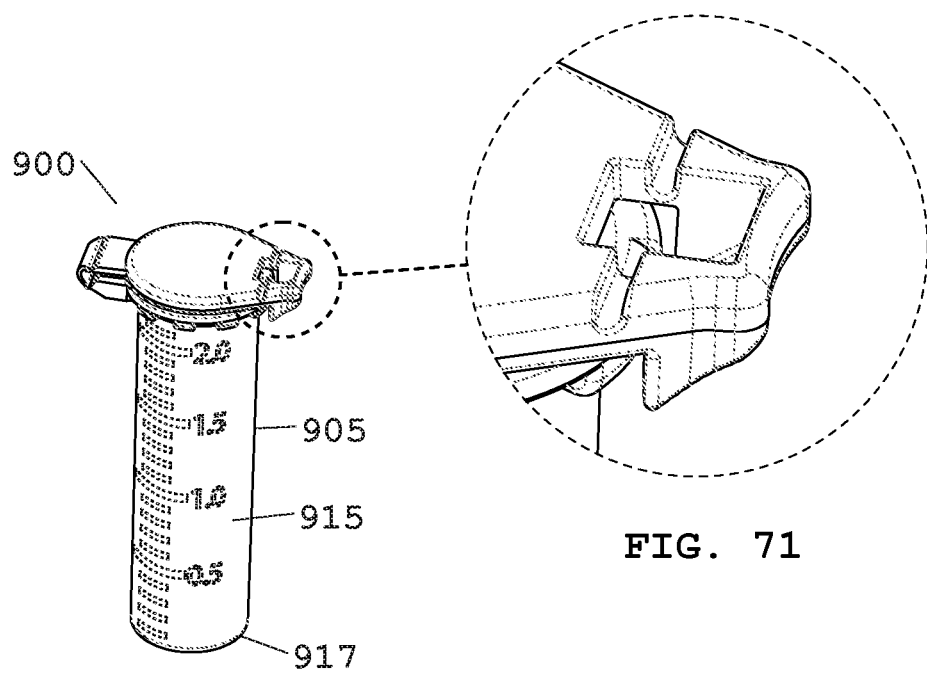
FIG. 70
FIG. 71
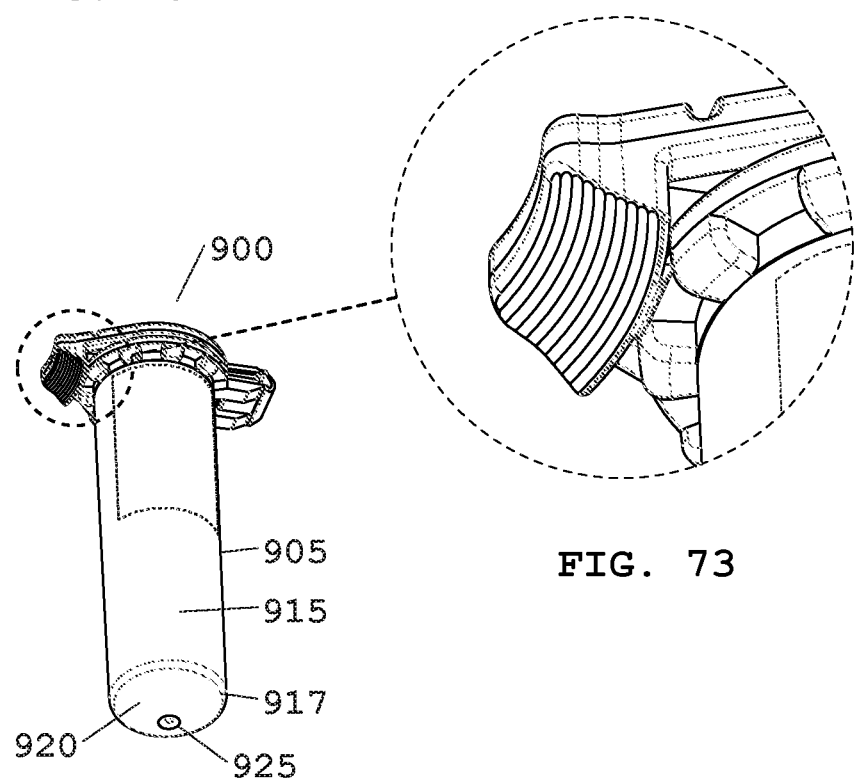
FIG. 72
FIG. 73

ERGONOMIC FLUID HANDLING TUBES

RELATED PATENT APPLICATION

This patent application claims the benefit of (i) U.S. provisional patent application No. 62/507,416, filed on May 17, 2017, naming Arta Motadel et al. as inventors, entitled ERGONOMIC FLUID HANDLING TUBES, (ii) U.S. provisional patent application No. 62/592,628, filed on Nov. 30, 2017, naming Arta Motadel et al. as inventors, entitled ERGONOMIC FLUID HANDLING TUBES, and (iii) U.S. provisional patent application No. 62/619,657, filed on Jan. 19, 2018, naming Arta Motadel et al. as inventors, entitled ERGONOMIC FLUID HANDLING TUBES. The entire content of the foregoing patent applications, including all text, tables and drawings, is incorporated herein by reference for all purposes.

FIELD

The technology relates in part to fluid handling tubes having a cap that includes a sealing member having interior grooves and panels. The technology also relates in part to fluid handling tubes having a cap that includes (i) a sealing member having a concave surface at a distal region, and (ii) a flat proximal surface. The technology also relates in part to fluid handling tubes having a cap that includes an engagement member or a fastener member disposed at an anterior portion of the cap, where the engagement member or fastener member includes an engagement surface having curvature and a taper. The technology also relates in part to fluid handling tubes having a cap that includes a tube sealing member, an anterior user engagement member and one or more channels (e.g., one or more furrows or grooves) between a sealing member and a fastener member that function as a hinge or pivot. The technology also relates in part to fluid handling tubes that include (i) a cap having a sealing member that includes an annular protrusion, and (ii) a tube body having an interior surface that includes an annular recess, where the annular recess in the tube body is configured to receive the annular protrusion of the tubular sealing member of the cap.

BACKGROUND

A fluid handling tube often is used to store and manipulate fluids in laboratory settings. A fluid handling tube sometimes is configured for placement in a chamber of a centrifuge for centrifugation, and can be referred to as a centrifuge tube or a micro-centrifuge tube. A fluid handling tube often includes a tube body and a cap that can be engaged with the tube body. The cap that can be engaged with the tube body to protect fluid in the tube from spillage, evaporation and/or contamination, for example. A cap can be in sealing engagement with a tube body, and a portion of such a cap can be inserted into the tube body interior to facilitate an air-tight seal.

SUMMARY

Provided in certain aspects is a fluid handling tube that includes a tube body and a cap. A tube body includes an exterior surface and an interior surface and the cap includes a proximal surface, a distal surface and a tubular sealing member protruding from the distal surface. The sealing member often includes a distal terminus opposite a distal surface of the cap, an interior surface, and a substantially smooth exterior surface configured to seal with the interior surface of the tube body. A cap sometimes is connected to a tube body via a connector, and sometimes is not connected to the tube body via a connector. A tube sometimes is provided with a cap engaged with the tube body, and sometimes a tube is provided with a cap disengaged from a tube body.

In certain aspects, an interior surface of the sealing member includes a plurality of longitudinally-oriented panels and a plurality of longitudinally-oriented grooves, where each of the grooves is adjacent to one of the panels. The wall thickness of the grooves typically is less than the wall thickness of the panels. Without being limited by theory, the thinner wall thickness of the grooves facilitate hoop compression of the tubular sealing member when the latter is inserted into the interior of a the tube body and an exterior surface of the tubular sealing member compresses against an interior surface of the tube body. Also without being limited by theory, an insertion force required to cause hoop compression for a tubular sealing member having grooves is substantially less than the insertion force required to cause hoop compression for a tubular sealing member not having grooves. Also without being limited by theory, a disengagement force required to disassociate a tubular sealing member having grooves from the tube body is substantially less than the disengagement force required to disassociate a tubular sealing member not having grooves. Reduced insertion and disengagement forces can reduce strain on a user associated with manipulating tubes, and can reduce the occurrence and severity of repetitive motion conditions, for example.

In certain aspects, an exterior wall portion of a tube body includes a plurality of spaced ribs circumferentially disposed around all or a portion of a circumference at or near the opening of the tube body. A tube body often includes a rim around the opening of the tube body, and the ribs sometimes are in contact with a portion of the rim. For a fluid handling tube that includes ribs disposed on a tube body and includes longitudinally-oriented grooves in a sealing member of a cap, the ribs sometimes are disposed opposite the grooves when the cap and the tube body are engaged. Without being limited by theory, the ribs can impart structural rigidity to the tube body at locations opposite the grooves, and can facilitate compression of the cap sealing member at the grooves.

In certain aspects, the distal surface of the cap includes a concave surface surrounded by the tubular sealing member, and the proximal surface of the cap is flat. Without being limited by theory, the concave surface reduces the amount of condensation within the tubular sealing member from fluid stored in a tube, and the flat proximal surface of the cap facilitates application of labeling and other modification.

In certain aspects, the cap includes an engagement member or fastener member disposed at an anterior portion of the cap, where the engagement member or fastener member includes an engagement surface having curvature and a taper. Without being limited by theory, the curved surface can conform more closely to the curvature of a user's finger or thumb than a flat surface and thereby reduce operator strain associated with tube manipulation (e.g., engaging and disengaging a tube cap). Also without being limited by theory, the tapered surface can conform more closely to the angle of a user's finger or thumb than a flat surface and thereby reduce operator strain associated with tube manipulation (e.g., engaging and disengaging a tube cap).

In certain aspects, the cap includes a tube sealing member, an anterior fastener member, and one or more channels (e.g., one or more furrows or grooves) between the sealing member and the fastener member. The one or more channels often are parallel to one another and often are co-linear. The major length of each channel often is parallel to the major length of a front surface of the fastener member. Without being limited by theory, the one or more channels function as a hinge and/or pivot, when a force is applied to a tube engagement surface in the proximal direction.

In certain aspects, a tubular sealing member of a cap includes an annular protrusion, the interior surface of the tube body includes an annular recess, and the annular recess in the tube body is configured to receive the annular protrusion of the tubular sealing member of the cap. Without being limited by theory, such an arrangement facilitates sealing of the tubular sealing member with the interior of the tube body.

Also provided in certain aspects are methods for manufacturing fluid handling tubes described herein, and molds used in manufacturing processes. Provided also in certain aspects are methods for using fluid handling tubes described herein.

Certain embodiments are described further in the following description, examples, claim(s) and drawings.

BRIEF DESCRIPTION OF THE DRAWINGS

The drawings illustrate certain embodiments of the technology and are not limiting. For clarity and ease of illustration, the drawings are not necessarily made to scale and, in some instances, various aspects may be shown exaggerated or enlarged to facilitate an understanding of particular embodiments.

FIG. 1 to FIG. 14 show a fluid handling tube embodiment having a cap not engaged with the tube body.

FIG. 1 is a top perspective view of fluid handling tube embodiment 100, and

FIG. 2 is an enlarged view of the region delineated by the broken line circle shown in FIG. 1.

FIG. 3 is a bottom perspective view,

FIG. 4 is a top view,

FIG. 5 is a side view, and

FIG. 7 is a bottom view, of fluid handling tube embodiment 100.

FIG. 6 is an enlarged section view through cutting plane R-R shown in FIG. 5.

FIG. 8 is a front side view and

FIG. 9 is a back side view of fluid handling tube embodiment 100.

FIG. 10 is a top view showing cutting plane AB-AB and

FIG. 11 shows a section view through AB-AB.

FIG. 12 is a section view through cutting plane A-A shown in FIG. 9.

FIG. 13 is an enlarged view of the region delineated by the broken line oval shown in FIG. 12, and FIG. 14 is an enlarged view of the region delineated by the broken line circle shown in FIG. 12.

FIG. 15 to FIG. 25 show fluid handling tube embodiment 100 with the cap engaged with the tube body.

FIG. 15 is a top perspective view,

FIG. 16 is a bottom perspective view,

FIG. 17 is a top view,

FIG. 18 is a side view, and

FIG. 19 is a bottom view, of fluid handling tube embodiment 100.

FIG. 20 is a front side view and

FIG. 21 is a back side view of fluid handling tube embodiment 100.

FIG. 22 is a section view through cutting plane B-B shown in FIG. 21.

FIG. 23 is an enlarged view of the region delineated by the broken line oval shown in FIG. 22, and FIG. 24 is an enlarged view of the region delineated by the broken line circle shown in FIG. 23.

FIG. 25 is an enlarged section view through cutting plane T-T shown in FIG. 21.

FIG. 26 to FIG. 31 show fluid handling tube embodiments having a cap not engaged with the tube body.

FIG. 26 shows a top perspective view, and

FIG. 27 shows a side view, of fluid handling tube embodiment 300.

FIG. 28 is an enlarged section view through cutting plane Y-Y shown in FIG. 27.

FIG. 29 shows a top perspective view, and

FIG. 30 shows a side view, of fluid handling tube embodiment 500.

FIG. 31 is an enlarged section view through cutting plane Z-Z shown in FIG. 30.

FIG. 32 to FIG. 45 show a fluid handling tube embodiment having a cap not engaged with the tube body.

FIG. 32 is a top perspective view of fluid handling tube embodiment 700, and

FIG. 33 is an enlarged view of the region delineated by the broken line circle shown in FIG. 32.

FIG. 34 is a bottom perspective view,

FIG. 35 is a top view,

FIG. 36 is a side view, and

FIG. 38 is a bottom view, of fluid handling tube embodiment 700.

FIG. 37 is an enlarged section view through cutting plane R-R shown in FIG. 36.

FIG. 39 is a front side view and

FIG. 40 is a back side view of fluid handling tube embodiment 700.

FIG. 41 is a top view showing cutting plane AB-AB and

FIG. 42 shows a section view through AB-AB.

FIG. 43 is a section view through cutting plane A-A shown in FIG. 40.

FIG. 44 is an enlarged view of the region delineated by the broken line oval shown in FIG. 43, and FIG. 45 is an enlarged view of the region delineated by the broken line circle shown in FIG. 43.

FIG. 46 to FIG. 63 show fluid handling tube embodiment 700 with the cap engaged with the tube body.

FIG. 46 is a top perspective view,

FIG. 48 is a bottom perspective view,

FIG. 50 is a top view,

FIG. 51 is a side view, and

FIG. 53 is a bottom view, of fluid handling tube embodiment 700.

FIG. 47 is an enlarged view of the region delineated by the broken line circle shown in FIG. 46.

FIG. 49 is an enlarged view of the region delineated by the broken line circle shown in FIG. 48.

FIG. 52 is an enlarged view of the region delineated by the broken line circle shown in FIG. 51.

FIG. 54 is a front side view and FIG. 55 is a back side view of fluid handling tube embodiment 700.

FIG. 56 is a section view through cutting plane B-B shown in FIG. 55.

FIG. 57 is an enlarged view of the region delineated by the broken line oval shown in FIG. 56, and FIG. 58 is an enlarged view of the region delineated by the broken line circle shown in FIG. 57.

FIG. 59 is an enlarged section view through cutting plane T-T shown in FIG. 55.

FIG. 60 is a top perspective view and FIG. 61 is an enlarged view of the region delineated by the broken line circle shown in FIG. 60.

FIG. 62 is a section view through cutting plane B-B shown in FIG. 55 when a force is applied to the engagement surface 825 in the proximal direction 898.

FIG. 63 is an enlarged view of the region delineated by the broken line circle shown in FIG. 62.

FIG. 64 to FIG. 76 show fluid handling tube embodiment 900 having features of fluid handling tube embodiment 700, except for a different distal tube body configuration.

FIG. 64 shows a top perspective view of a fluid handling tube embodiment in which the cap is not engaged with the tube body (volume text and a portion of volumetric graduation lines are depicted by broken line text and are optional).

FIG. 65 shows an enlarged view of the cap region encircled by the broken line circle shown in FIG. 64.

FIG. 66 shows a bottom perspective view of the fluid handling tube embodiment shown in FIG. 64 (a portion of a writing panel is depicted by broken line text and is optional).

FIG. 67 shows a top view thereof,

FIG. 68 shows a side view thereof (volumetric graduation lines and volume text are depicted by broken line text and are optional), and FIG. 69 shows a bottom view thereof.

FIG. 70 shows a top perspective view of a fluid handling tube embodiment in which the cap is engaged with the tube body (volumetric graduation lines and volume text are depicted by broken line text and are optional).

FIG. 71 shows an enlarged view of the region encircled by the broken line circle shown in FIG. 70.

FIG. 72 shows a bottom perspective view of the fluid handling tube embodiment shown in FIG. 70 (a portion of a writing panel is depicted by broken line text and is optional).

FIG. 73 shows an enlarged view of the region encircled by the broken line circle shown in FIG. 72.

FIG. 74 shows a top view thereof,

FIG. 75 shows a side view thereof (volumetric graduation lines and volume text are depicted by broken line text and are optional), and FIG. 76 shows a bottom view thereof.

Figure 15:
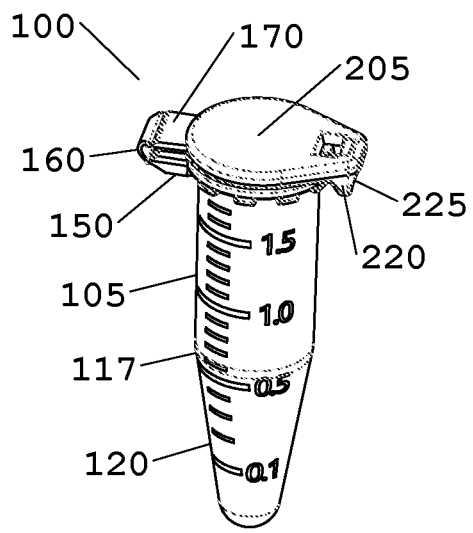
Figure 16:
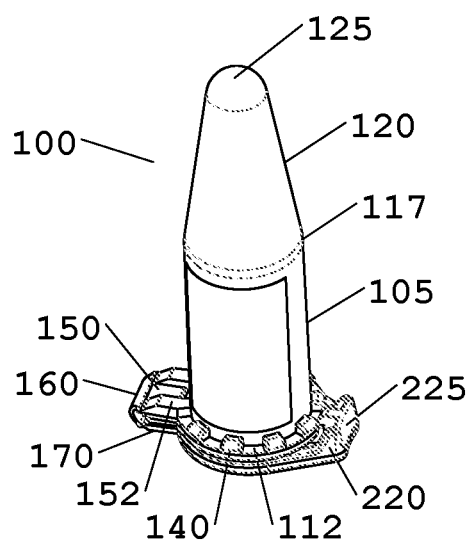
Figure 17:
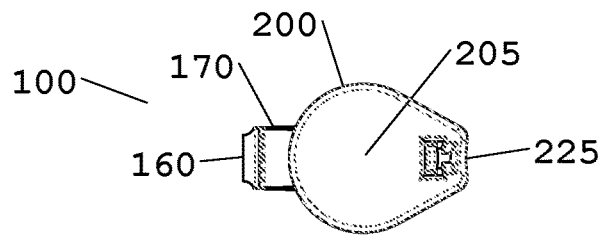

Certain features in the drawings are summarized in Table 1.

TABLE 1

| callout | feature |
| --- | --- |
| 100 | fluid handling tube embodiment |
| 105 | tube body |
| 107 | tube rim |
| 108 | side of tube rim at fastener-rim junction |
| 110 | rim proximal surface |
| 111 | fastener member proximal surface |
| 112 | rim distal surface |
| 113, 113A, 113B | volumetric graduation marking (optional) |
| 114 | volume indicator (optional) |
| 115 | tube body exterior wall - proximal portion |
| 116 | writing panel (optional) |
| 117 | transition between tube proximal portion and tube distal portion |
| 120 | tube body exterior wall - distal portion |
| 125 | tube body - bottom |
| 130 | tube interior |
| 131 | tube interior wall |
| 132 | tube interior bottom |
| 133 | annular recess |
| 134 | interior sloped surface |

TABLE 1-continued

| callout | feature |
| --- | --- |
| 135 | cap fastener member on tube body |
| 136 | fastener member engagement surface |
| 137 | fastener member sloped surface |
| 138 | tube sealing member sealing region in tube |
| 139 | circular cap and tube body interface |
| 140 | rib |
| 141 | rim distal surface |
| 150 | tube to tether connector |
| 152 | tube to tether connector support |
| 160 | tether |
| 170 | cap to tether connector |
| 200 | cap |
| 205 | cap proximal surface |
| 209 | cap rim |
| 210 | cap rim - exterior surface |
| 211 | cap engagement member |
| 215 | cap distal surface |
| 217 | cap rim - distal surface |
| 219 | cap rim - interior surface |
| 220 | engagement member side support |
| 221 | first side support |
| 222 | second side support |
| 225 | engagement member front wall |
| 226 | proximal terminus of front wall |
| 227 | distal terminus of front wall |
| 230 | tube fastener member on cap |
| 235 | fastener member protrusion |
| 237 | fastener member engagement surface |
| 240 | fastener member support member |
| 245 | cap bore |
| 247 | cap bore edge |
| 250 | cap sealing member |
| 252 | sealing member exterior wall |
| 253 | sealing member annular protrusion |
| 254 | sealing member terminus; sealing member rim |
| 255 | sealing member interior wall |
| 257 | sealing member sloped surface |
| 260 | sealing member panel edge (also referred to as sealing member rim and distal terminus of sealing member) |
| 262 | sealing member edge at groove (also referred to as sealing member rim and distal terminus of sealing member) |
| 263 | groove |
| 265 | panel |
| 266 | panel surface - face |
| 270 | panel surface - side |
| 280 | panel surface - proximal portion |
| 282 | panel curved portion |
| 290 | sealing member interior surface - proximal portion |
| 291 | viewing perspective |
| 292 | panel circumferential width |
| 293 | groove circumferential width |
| 294 | thickness between groove floor and sealing member exterior wall |
| 295 | longitudinal axis |
| 296 | thickness between panel face and sealing member exterior wall |
| 297 | longitudinal axis |
| 298 | proximal direction |
| 299 | viewing perspective |
| 300 | fluid handling tube embodiment |
| 305 | tube body |
| 307 | tube rim |
| 313, 313A, 313B | volumetric graduation markings (optional) |
| 316 | volume indicator (optional) |
| 317 | transition between tube proximal portion and tube distal portion |
| 320 | tube body exterior wall - distal portion |
| 325 | tube body - bottom |
| 335 | cap fastener member on tube body |
| 340 | rib |
| 350 | tube to tether connector |
| 360 | flexible tether |
| 370 | cap to tether connector |
| 400 | cap |
| 405 | cap proximal surface |
| 415 | cap distal surface |

TABLE 1-continued

| callout | feature |
|---|---|
| 417 | cap rim - distal surface |
| 420 | engagement member side support |
| 425 | engagement member front wall |
| 430 | tube fastener member on cap |
| 450 | cap sealing member |
| 452 | sealing member exterior wall |
| 453 | sealing member annular protrusion |
| 460 | sealing member panel edge (also referred to as sealing member rim) |
| 463 | groove |
| 465 | panel |
| 466 | panel surface - face |
| 470 | panel surface - side |
| 490 | sealing member proximal portion - interior surface |
| 500 | fluid handling tube embodiment |
| 505 | tube body |
| 507 | tube rim |
| 513, 513A, 513B | volumetric graduation markings (optional) |
| 514 | volume indicator (optional) |
| 517 | transition between tube proximal portion and tube distal portion |
| 520 | tube body exterior wall - distal portion |
| 525 | tube body - bottom |
| 535 | cap fastener member on tube body |
| 540 | rib |
| 550 | tube to tether connector |
| 560 | flexible tether |
| 570 | cap to tether connector |
| 600 | cap |
| 605 | cap proximal surface |
| 615 | cap distal surface |
| 617 | cap rim - distal surface |
| 620 | engagement member side support |
| 625 | engagement member front wall |
| 630 | tube fastener member on cap |
| 650 | cap sealing member |
| 652 | sealing member exterior wall |
| 653 | sealing member annular protrusion |
| 660 | sealing member panel edge (also referred to as sealing member rim) |
| 663 | groove |
| 665 | panel |
| 667 | panel surface - face |
| 670 | panel surface - side |
| 690 | sealing member proximal portion - interior surface |
| 700 | fluid handling tube embodiment |
| 705 | tube body |
| 707 | tube rim |
| 708 | side of tube rim at fastener-rim junction |
| 710 | rim proximal surface |
| 711 | fastener member proximal surface |
| 712 | rim distal surface |
| 713, 713A, 713B | volumetric graduation markings (optional) |
| 714 | volume indicator (optional) |
| 715 | tube body exterior wall - proximal portion |
| 716 | writing panel (optional) |
| 717 | transition between tube proximal portion and tube distal portion |
| 720 | tube body exterior wall - distal portion |
| 725 | tube body - bottom |
| 730 | tube interior |
| 731 | tube interior wall |
| 732 | tube interior bottom |
| 733 | annular recess |
| 734 | interior sloped surface |
| 735 | cap fastener member on tube body |
| 736 | fastener member engagement surface |
| 737 | fastener member sloped surface |
| 738 | sealing region |
| 739 | circular cap and tube body interface |
| 740 | rib |
| 741 | rim distal surface |
| 750 | tube to tether connector |
| 752 | tube to tether connector support |
| 760 | tether |
| 765 | junction between tether and cap to tether connector |
| 770 | cap to tether connector |
| 800 | cap |
| 805 | cap proximal surface |
| 809 | cap rim |
| 810 | cap rim - exterior surface |
| 811 | front surface of fastener member |
| 812 | engagement surface ridge |
| 813 | engagement surface trough |
| 814 | internal anterior sidewall of fastener member |
| 815 | cap distal surface |
| 817 | cap rim - distal surface |
| 819 | cap rim - interior surface |
| 820 | fastener member exterior sidewall |
| 821 | first exterior wall of fastener member |
| 822 | second exterior wall of fastener member |
| 825 | engagement surface of fastener member |
| 826 | proximal terminus of engagement surface |
| 827 | distal terminus of engagement surface |
| 828A, 828B | angle between engagement surface and longitudinal axis |
| 829 | fastener member internal inclined wall |
| 830 | tube fastener member of cap |
| 831 | fastener member proximal surface |
| 833 | cap body |
| 835 | fastener member protrusion |
| 836 | bore posterior sidewall of cap body |
| 837 | fastener member engagement surface |
| 838 | fastener member external posterior wall |
| 840 | channel opening at proximal surface of fastener member |
| 841 | channel opening at proximal surface of cap body |
| 842 | material between channel floor and cap distal surface |
| 843, 843A, 843B | channel |
| 843C | channel floor |
| 843D | channel anterior sidewall |
| 843E | channel posterior sidewall |
| 844A, 844B | channel terminus at cap rim exterior surface 810 |
| 844C, 844D | channel terminus at bore (i.e., at bore surfaces 846 and 847) |
| 845 | cap bore |
| 846 | bore interior sidewall of cap body |
| 847 | bore interior sidewall of fastener member |
| 848, 848A, 848B | bore perimeter at cap proximal surface |
| 849, 849A, 849B | cap bore perimeter at tube fastener member of cap |
| 850 | cap sealing member |
| 852 | sealing member exterior wall |
| 853 | sealing member annular protrusion |
| 854 | sealing member terminus; sealing member rim |
| 855 | sealing member interior wall |
| 857 | sealing member sloped surface |
| 860 | sealing member panel edge (also referred to as sealing member rim and distal terminus of sealing member) |
| 862 | sealing member edge at groove (also referred to as sealing member rim and distal terminus of sealing member) |
| 863 | groove |
| 865 | panel |
| 866 | panel surface - face |
| 870 | panel surface - side |
| 880 | panel surface - proximal portion |
| 882 | panel curved portion |
| 888A, 888B | width of channel opening |
| 889 | latitudinal axis |
| 890 | sealing member interior surface - proximal portion |
| 891 | viewing perspective |
| 892 | panel circumferential width |
| 893 | groove circumferential width |
| 894 | thickness between groove floor and sealing member exterior wall |
| 895 | longitudinal axis |
| 896 | thickness between panel face and sealing member exterior wall |
| 897 | longitudinal axis |
| 898 | proximal direction |
| 899 | viewing perspective |
| 900 | fluid handling tube embodiment |
| 905 | tube body |
| 915 | tube body exterior wall - proximal portion |

TABLE 1-continued

| callout | feature |
| --- | --- |
| 917 | transition between tube proximal portion and tube distal portion |
| 920 | tube body exterior wall - distal portion |
| 925 | tube body - bottom |

DETAILED DESCRIPTION

Provided in part herein are fluid handling tube embodiments that (i) permit ergonomic engagement and disengagement of cap and tube portions, (ii) permit ergonomic engagement and disengagement of cap and tube portions, and (iii) reduce condensation in a cap portion and concomitantly facilitate labeling and other modification.

Ergonomic Tubular Sealing Member Groove and Panel Configurations

Provided in certain embodiments are fluid handling tubes that include a tube body and a cap, where the tube body includes an exterior surface and an interior surface. The cap often includes a proximal surface, a distal surface and a tubular sealing member protruding from the distal surface. The sealing member often includes a distal terminus opposite a distal surface of the cap, an interior surface, and a substantially smooth exterior surface configured to seal with the interior surface of the tube body. The interior surface of the sealing member often includes a plurality of longitudinally-oriented panels and a plurality of longitudinally-oriented grooves, where each of the grooves is adjacent to one of the panels. The length of longitudinally-oriented panels and grooves is larger than the width of such panels and grooves. The length of longitudinally-oriented grooves and panels (e.g., thickened line shown on panel face 265 in FIG. 11; thickened line shown on panel face 865 in FIG. 42) typically is parallel or substantially parallel to a longitudinal axis of the tubular sealing member (i.e., longitudinal axis 295 shown in FIG. 11; longitudinal axis 895 shown in FIG. 42). The length of a groove or panel that is substantially parallel to a longitudinal axis can deviate from parallel by about 10 degrees or less. The longitudinally-oriented edges of adjacent panels typically define each groove there between, and there typically is an equal number of grooves and panels in a sealing member.

An interior surface of the sealing member can include any suitable number of panels and grooves. A sealing member sometimes includes 4 or more grooves (e.g., 4 to about 50 grooves; 4 to about 40 grooves; about 5 to about 40 grooves; about 6 to about 40 grooves; about 7 to about 40 grooves; about 8 to about 40 grooves; about 9 to about 40 grooves; about 10 to about 40 grooves; about 10 to about 30 grooves; about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 grooves) and sometimes includes 4 or more panels (e.g., 4 to about 50 panels; 4 to about 40 panels; about 5 to about 40 panels; about 6 to about 40 panels; about 7 to about 40 panels; about 8 to about 40 panels; about 9 to about 40 panels; about 10 to about 40 panels; about 10 to about 30 panels; about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 panels).

Grooves and panels often extend to the distal terminus of the sealing member (e.g., grooves extend to edge 262 and panels extend to edge 260 as shown in FIG. 2; grooves extend to edge 862 and panels extend to edge 860 as shown in FIG. 33). Grooves and panels sometimes initiate near the proximal terminus of the tubular sealing member interior surface, and sometimes traverse about 50% or more of the longitudinal distance from the proximal terminus to the distal terminus of the tubular sealing member (e.g., about 60% to about 95%; about 70% to about 90%; about 75% to about 85%; about 50%, 55%, 60%, 65%, 70%, 75%, 80%, 85%, 90%, 95% of the longitudinal distance from the proximal terminus to the distal terminus of the tubular sealing member).

Each panel often includes a face surface, a side surface and a groove-to-panel transition. A groove often includes a floor that can run the longitudinal length of the groove. Wall thickness of the sealing member at a groove is less than the wall thickness of the sealing member at a panel.

Wall thickness between a groove floor and the exterior surface of the sealing member across from the groove floor (e.g., thickness 294 shown in FIG. 11; thickness 894 shown in FIG. 42) sometimes is about 0.003 inches to about 0.035 inches (e.g., about 0.005 inches to about 0.020 inches; about 0.007 inches to about 0.015 inches; about 0.009 inches to about 0.015 inches; about 0.010 inches to about 0.014 inches; about 0.011 inches to about 0.013 inches; about 0.003, 0.004, 0.005, 0.006, 0.007, 0.008, 0.009, 0.010, 0.011, 0.012, 0.013, 0.014, 0.015, 0.016, 0.017, 0.018, 0.019, 0.020, 0.021, 0.022, 0.023, 0.024, 0.025, 0.026, 0.027, 0.028, 0.029, 0.030 inches). Two or more or all grooves in a sealing member often have the same wall thickness between a groove floor and the exterior surface of the sealing member across from the groove floor. Two or more grooves in a sealing member sometimes have a different wall thickness between a groove floor and the exterior surface of the sealing member across from the groove floor, and sometimes there are 2, 3, 4, 5 or more different groove wall thickness species in a sealing member that can be arranged in a suitable pattern (e.g., alternating pattern or grouped pattern).

Figure 44:
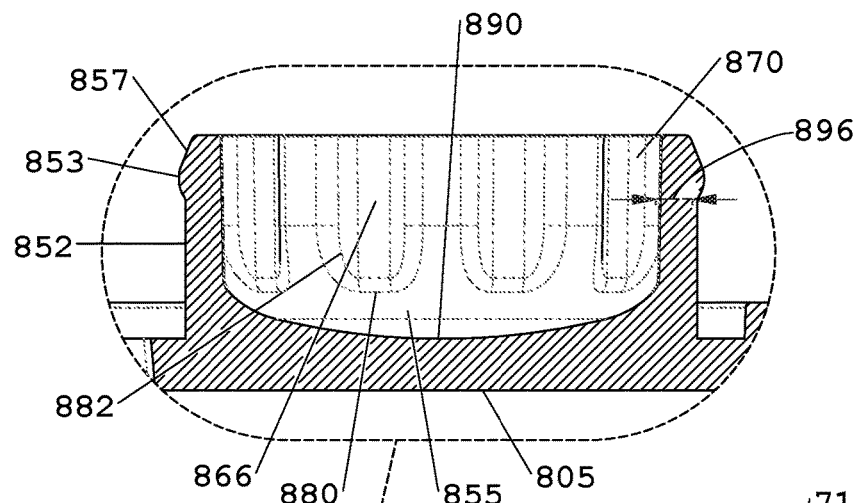

Wall thickness between a panel face and the exterior surface of the sealing member across from the panel face (e.g., thickness 296 shown in FIG. 13; thickness 896 shown in FIG. 44) sometimes is 0.010 inches to about 0.080 inches (e.g., about 0.010 inches to about 0.070 inches; about 0.010 inches to about 0.060 inches; about 0.015 inches to about 0.050 inches; about 0.015 inches to about 0.040 inches; about 0.020 inches to about 0.040 inches; about 0.025 inches to about 0.030 inches; about 0.010, 0.011, 0.012, 0.013, 0.014, 0.015, 0.016, 0.017, 0.018, 0.019, 0.020, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, 0.040, 0.041, 0.042, 0.043, 0.044, 0.045, 0.046, 0.047, 0.048, 0.049, 0.050, 0.051, 0.052, 0.053, 0.054, 0.055, 0.056, 0.057, 0.058, 0.059, 0.060 inches). Two or more or all panels in a sealing member often have the same wall thickness between a panel face and the exterior surface of the sealing member across from the panel face. Two or more panels in a sealing member sometimes have a different wall thickness between a panel face and the exterior surface of the sealing member across from the panel face, and sometimes there are 2, 3, 4, 5 or more different panel wall thickness species in a sealing member that can be arranged in a suitable pattern (e.g., alternating pattern or grouped pattern).

A width of a panel or a groove typically is measured perpendicular to the longitudinal axis (i.e., axis 295 shown in FIG. 11; axis 895 shown in FIG. 42) of a tubular sealing member. A width sometimes is expressed as a linear distance from one side of a groove or panel to the other side, and sometimes is expressed as a circumferential distance measured from one side of the groove or panel to the other side. A circumferential distance sometimes is expressed in degrees (i.e., a portion of 360 degrees) and can be expressed in radians.

A linear distance and a circumferential distance of a groove typically are measured between the terminus of one flanking panel at the groove and the terminus of the other flanking panel at the groove (e.g., width 293 shown in FIG. 11; width 893 shown in FIG. 42). In some embodiments, all of the grooves of a sealing member have the same width. In certain embodiments, one or more of the grooves of a sealing member have different widths (e.g., 2, 3, 4, 5, 6, 7, 8, 9, 10 or more different widths for grooves). One or more grooves of a sealing member sometimes have a groove width (linear distance) of about 0.008 inches to about 0.08 inches (e.g., about 0.009, 0.01, 0.02, 0.03, 0.04, 0.05, 0.06, 0.07, 0.08 inches (e.g., about 0.01 inches to about 0.04 inches; about 0.02 inches to about 0.03 inches (e.g., about 0.027 inches))) and intermediate values there between. A circumferential distance for a groove width typically is measured along a virtual circumference that contacts (i) the panel termini at the groove, and (ii) the center point of the longitudinal groove length. In some embodiments, one or more grooves of a sealing member have a circumferential width of about 2 degrees to about 30 degrees (e.g., about 3, 4, 5, 6, 7, 8, 9, 10, 11, 12, 13, 14, 15, 16, 17, 18, 19, 20, 21, 22, 23, 24, 25, 26, 27, 28, 29 degrees (e.g., about 7 to about 11 degrees; about 8 to about 10 degrees)) and intermediate values there between.

A panel width typically is measured from the one panel sidewall terminus to the opposite panel sidewall terminus. In some embodiments, all of the panels of a sealing member have the same width (e.g., width 292 shown in FIG. 11; width 892 shown in FIG. 42). In certain embodiments, one or more of the panels of a sealing member have different widths (e.g., 2, 3, 4, 5, 6, 7, 8, 9, 10 or more different widths for panels). In some embodiments, one or more panels have a panel width of about 0.008 inches to about 0.25 inches (e.g., about 0.009, 0.01, 0.02, 0.03, 0.04, 0.05, 0.06, 0.07, 0.08, 0.09, 0.1, 0.15, 0.2 inches (e.g., about 0.06 inches to about 0.1 inches; about 0.07 inches to about 0.09 inches)) and intermediate values there between. A circumference distance for a panel width typically is measured along a virtual circumference that contacts (i) the panel faces, and (ii) the center point of the longitudinal panel length. In some embodiments, one or more panels of a sealing member have a circumferential width of about 2 degrees to about 80 degrees (e.g., about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 46, 37, 38, 39, 40, 45, 50, 55, 60, 65, 70, 75, 80, 85 degrees (e.g., about 20 to about 35 degrees; about 25 to about 30 degrees)) and intermediate values there between In some embodiments, two or more of the panels are regularly distributed around the interior surface of the sealing member, and in certain embodiments, all of the panels are regularly distributed around the interior surface of the sealing member (e.g., all of the grooves have the same groove width). In some embodiments, two or more of the panels are asymmetrically distributed around the interior surface of the sealing member. In some embodiments, two or more of the grooves are regularly distributed around the interior surface of the sealing member, and in certain embodiments, all of the grooves are regularly distributed around the interior surface of the sealing member (e.g., all of the panels have the same panel width). In some embodiments, two or more of the grooves are asymmetrically distributed around the interior surface of the sealing member.

In some embodiments, a latitudinal profile of one or more or all panel sidewalls of a sealing member is flat, sometimes is stepped at about 90 degrees relative to the linear width of a panel face, and sometimes is angled at a non-90 degree angle relative to the linear width of a panel face (e.g., an angle of about 30 degrees to about 89 degrees; about 35 degrees to about 85 degrees; about 40, 45, 50, 55, 60, 65, 70, 75, 80 degrees). A latitudinal profile is a profile across a latitudinal axis or cutting plane of a tube member, which latitudinal distance or cutting plane is perpendicular to a longitudinal axis (e.g., axis 295 shown in FIG. 11; axis 895 shown in FIG. 42). The latitudinal profile of one or more or all panel sidewalls in some embodiments is curved. An example of a latitudinal profile is shown in FIG. 25 and FIG. 59. The latitudinal profile of one or more or all panel faces sometimes is flat, a point or substantially a point, beveled or curved, and the latitudinal profile of one or more or all grooves sometimes is flat, a point or substantially a point, beveled or curved. One or more or all panel faces in some embodiments include a protrusion. A protrusion sometimes extends along part, the majority of, or all of the longitudinal length of a panel, and a protrusion often includes a protrusion face and protrusion sidewalls. The latitudinal profile of one or more or all protrusion faces sometimes is flat, a point or substantially a point, beveled or curved, and the latitudinal profile of one or more or all protrusion sidewalls sometimes independently is flat, beveled or curved. One or more or all panel faces in some embodiments do not include a protrusion. A curved surface sometimes includes a concave curve, sometimes includes a convex curve, sometimes is a single curve (i.e., one arc), and sometimes is a compound curve (i.e., two or more arcs).

In certain embodiments, panel thickness (e.g., thickness 296 shown in FIG. 13; thickness 896 shown in FIG. 44) along a longitudinal length of a panel sometimes is uniform or substantially uniform (i.e., a substantially uniform thickness changes 5% or less across the longitudinal length), sometimes is tapered from the proximal portion to the distal portion of the sealing member (i.e., the thickness is greater at the proximal portion and is less at the distal portion), and sometimes is flared from the proximal portion to the distal portion of the sealing member (i.e., the thickness is less at the proximal portion and is greater at the distal portion), for one or more or all panels of a sealing member. In some embodiments, groove thickness (e.g., thickness 294 shown in FIG. 11; thickness 894 shown in FIG. 42) along a longitudinal length of a groove sometimes is uniform or substantially uniform (i.e., a substantially uniform thickness changes 5% or less across the longitudinal length), sometimes is tapered from the proximal portion to the distal portion of the sealing member (i.e., the thickness is greater at the proximal portion and is less at the distal portion), and sometimes is flared from the proximal portion to the distal portion of the sealing member (i.e., the thickness is less at the proximal portion and is greater at the distal portion), for one or more or all grooves of a sealing member.

In certain embodiments, a fluid handling tube is provided with, or manipulated to result in, the tubular sealing member of the cap inserted in the tube body and in sealing connection with a portion of the tube body. Without being limited by theory, the tubular sealing member of the cap typically is in a compressed state (e.g., hoop compression around the perimeter of the sealing member) relative to a relaxed state adopted by the tubular sealing member when it is not sealed in the tube body.

A non-limiting example of a fluid handling tube having a sealing member with interior panels and grooves is illustrated in the FIG. 1 to FIG. 25. FIG. 1 to FIG. 14 show fluid handling tube 100 with cap 200 detached from tube body 105. Tube body 105 includes tube body rim 107, rim proximal surface 110, proximal portion 115 of the tube body exterior wall, distal portion 120 of the tube body exterior wall, transition 117 between the tube body proximal portion and tube body distal portion, tube body bottom 125, tube body interior 130, tube body interior wall 131, tube body interior bottom 132, and interior sloped surface 134. Cap 200 includes proximal surface 205, cap distal surface 215, cap engagement member 211, cap rim 209, cap rim distal surface 217, cap rim exterior surface 210, and cap rim interior surface 219. Cap 200 also includes cap sealing member 250, sealing member exterior wall 252, sealing member interior wall 255, curved interior surface 290 of the proximal portion of the sealing member, and sloped surface 257.

The interior of cap sealing member 250 includes a plurality of longitudinally-disposed grooves 263 and panels 265. Grooves 263 include edge 262, curved portion 282, groove circumferential width 293, and thickness 294 between groove floor and sealing member exterior wall. Panels 265 include panel face 266, panel side 270, proximal portion 280, panel edge 260 (also referred to as sealing member rim), panel circumferential width 292, and thickness 296 between panel face and sealing member exterior wall. The interior of cap sealing member 250 also includes a panel-to-interior wall transition and groove-to-panel transition.

FIG. 15 to FIG. 25 show fluid handling tube 100 with cap 200 in sealing attachment with tube body 105. Exterior surface 252 of tubular sealing member 250 contacts interior wall 131 of tube body 105, and can form a seal at sealing member sealing region 138. A circular cap and tube body interface 139 is shown in FIG. 25. Exterior surface 252 of tubular sealing member 250 sometimes is in contact with interior wall 131 of tube body, and sometimes exterior surface 252 is spaced from interior wall 131 (e.g., spaced about 0.00001 inches to about 0.005 inches) Tube body interior sloped surface 134 and cap sealing member sloped surface 257 each can be at a suitable angle to function as a lead-in surface that facilitates alignment, positioning and/or engagement of sealing member 250 of cap 200 with tube interior wall surface 131 of tube body 105.

Another non-limiting example of a fluid handling tube having a sealing member with interior panels and grooves is illustrated in the FIG. 32 to FIG. 63. FIG. 32 to FIG. 45 show fluid handling tube 700 with cap 800 detached from tube body 705. Tube body 705 includes tube body rim 707, rim proximal surface 710, proximal portion 715 of the tube body exterior wall, distal portion 720 of the tube body exterior wall, transition 717 between the tube body proximal portion and tube body distal portion, tube body bottom 725, tube body interior 730, tube body interior wall 731, tube body interior bottom 732, and interior sloped surface 734. Cap 800 includes proximal surface 805, cap distal surface 815, front surface 811, cap fastener member exterior surface 825, cap rim 809, cap rim distal surface 817, cap rim exterior surface 810, and cap rim interior surface 819. Cap 800 also includes cap sealing member 850, sealing member exterior wall 852, sealing member interior wall 855, curved interior surface 890 of the proximal portion of the sealing member, and sloped surface 857.

The distal portion of a tube body sometimes includes exterior sidewalls that are flat and taper from the proximal region/distal region junction to the tube body bottom. A taper angle in such embodiments (e.g., defined by the angle between the exterior wall of the distal region to the exterior wall of the proximal region) can be of any suitable angle, and non-limiting examples of taper angles range from a relatively small taper angle in tube embodiment 100 to a relatively large taper angle shown in tube embodiment 900. The bottom of a tube body (e.g., tube body 125, 325, 535, 725, 925) can be of any suitable configuration. For example, the exterior surface of a bottom of a tube body can be pointed, flat, curved (e.g., concave curved surface protruding inwards and towards the tube interior, convex curved surface protruding outwards from the tube exterior), sometimes includes curved sides transitioning to a flat terminus, and sometimes includes flat tapered sides transition to a flat terminus. The body of a tube body sometimes is a configuration permitted by a tube molding process, and is of a configuration that results from being located at or near an injection mold gate.

The interior of cap sealing member 850 includes a plurality of longitudinally-disposed grooves 863 and panels 865. Grooves 863 include edge 862, curved portion 882, groove circumferential width 893, and thickness 894 between groove floor and sealing member exterior wall. Panels 865 include panel face 866, panel side 870, proximal portion 880, panel edge 860 (also referred to as sealing member rim), panel circumferential width 892, and thickness 896 between panel face and sealing member exterior wall. The interior of cap sealing member 850 also includes a panel-to-interior wall transition and groove-to-panel transition.

FIG. 46 to FIG. 63 show fluid handling tube 700 with cap 800 in sealing attachment with tube body 705. Exterior surface 852 of tubular sealing member 850 contacts interior wall 731 of tube body 705, and can form a seal at sealing member sealing region 738. A circular cap and tube body interface 739 is shown in FIG. 59. Exterior surface 852 of tubular sealing member 850 sometimes is in contact with interior wall 731 of tube body, and sometimes exterior surface 852 is spaced from interior wall 731 (e.g., spaced about 0.00001 inches to about 0.005 inches) Tube body interior sloped surface 734 and cap sealing member sloped surface 857 each can be at a suitable angle to function as a lead-in surface that facilitates alignment, positioning and/or engagement of sealing member 850 of cap 800 with tube interior wall surface 731 of tube body 705.

FIG. 1 to FIG. 25 show fluid handling tube embodiment 100 having a particular groove and panel geometry, and FIG. 32 to FIG. 63 show fluid handling tube embodiment 700 having a similar groove and panel geometry as in tube embodiment 100. Any other suitable groove and panel geometry can be chosen that facilitates hoop compression of the sealing member when it is inserted in the tube body. Non-limiting examples of alternative groove and panel geometries are illustrated for fluid handling tube embodiment 300 shown in FIG. 26 to FIG. 28 and for fluid handling tube embodiment 500 shown in FIG. 29 to FIG. 31. Sealing member 450 of cap 400 in fluid handling tube embodiment 300 includes curved grooves 463 and panels 465 each having a curved face 466 and curved side 470. Curved profiles of groove 463, panel face 466 and panel side 470 can have any suitable radius that facilitates hoop compression of the sealing member when it is engaged with an interior wall of the tube body. Sealing member 650 of cap 600 in fluid handling tube embodiment 500 includes a beveled groove-and-panel arrangement. Sealing member 650 includes pointed grooves 663 and panels 665 each having a pointed face 667 and angled sides 670. Angled sides 670 can have any suitable angle that facilitates hoop compression of the sealing member when it is engaged with an interior wall of the tube body (e.g. an angle measured between one side of a panel and another side of the same panel sometimes is about 115 degrees to about 210 degrees; sometimes is about 135 degrees to about 190 degrees; sometimes is about 155 degrees to about 170 degrees; and sometimes is about 156, 158, 160, 162, 164, 166, 168, 170, 172, 174, 176 degrees, including intermediate values there between).

Ergonomic Operator Engagement Surface

Provided in certain embodiments are tubes that include a tube body and a cap, which tube body includes an exterior surface and an interior surface. The cap includes a proximal surface, a distal surface and a tubular sealing member protruding from the distal surface. The sealing member often includes a distal terminus opposite the distal surface of the cap, an interior surface, and a substantially smooth exterior surface configured to seal with the interior surface of the tube body.

The cap can include, in certain embodiments, an engagement member at an anterior portion of the cap. An engagement member sometimes contains a surface that includes a radius of curvature and a taper. In certain embodiments, an engagement member includes a front wall, a first side support and a second side support, where the first side support and the second side support are connected to the front wall on each side of the front wall. In some embodiments, the front wall includes a taper or a radius of curvature, or a taper and a radius of curvature.

The cap can include, in some embodiments, a fastener member at an anterior portion of the cap. A fastener member sometimes contains a surface that includes a radius of curvature and a taper. In some embodiments, a fastener member includes a front surface, an engagement surface, a first sidewall and a second sidewall, where the first sidewall and the second sidewall are connected to the engagement surface on each side of the engagement surface. In some embodiments, the engagement surface includes a taper or a radius of curvature, or a taper and a radius of curvature.

In certain embodiments, a taper is longitudinally disposed. In some embodiments a taper is angled with respect to longitudinal axis 297 shown in FIG. 18. In certain embodiments, a taper is angled with respect to longitudinal axis 897 shown in FIG. 52 with angle 828A.

In certain embodiments, a taper of an engagement member surface is at a suitable angle that slopes (i) inwardly towards the nearest exterior surface of the tube body when the cap is engaged with the tube body, and (ii) from the proximal terminus to the distal terminus of the engagement member front wall (e.g., proximal terminus 226 and distal terminus 227 shown in FIG. 23). In some embodiments, a taper of an engagement surface of a fastener member is at a suitable angle that slopes (i) inwardly towards the nearest exterior surface of the tube body when the cap is engaged with the tube body, and (ii) from the proximal terminus to the distal terminus of the engagement surface (e.g., proximal terminus 826 and distal terminus 827 shown in FIG. 57). A suitable angle that facilitates displacement of the cap in a proximal direction when the cap is in attachment with the tube body can be chosen (i.e., direction 298 shown in FIG. 23; direction 898 shown in FIG. 57). An angle suitable for such displacement by an operator applying a force to the engagement surface by the operator's finger or thumb often is chosen.

In some embodiments, an angle for an engagement member surface that (i) slopes inwardly from the proximal terminus to the distal terminus of the engagement member front wall and (ii) deviates from a longitudinal axis that contacts the proximal terminus of the engagement surface front wall (e.g., longitudinal axis 297 shown in FIG. 18 that contacts proximal terminus 226 shown in FIG. 23) of about 5 degrees to about 80 degrees, can be selected (e.g., about 10 degrees to about 70 degrees; about 20 degrees to about 60 degrees; about 30 degrees to about 55 degrees; about 10 degrees to about 20 degrees; about 50 degrees to about 60 degrees (e.g., about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65 degrees) including intermediate values there between.

In certain embodiments, an angle for an engagement surface of a fastener member that (i) slopes inwardly from the proximal terminus to the distal terminus of the fastener member engagement surface and (ii) deviates from a longitudinal axis that contacts the proximal terminus of the engagement surface (e.g., longitudinal axis 897 shown in FIG. 51 that contacts proximal terminus 826 shown in FIG. 52) of about 20 degrees to about 80 degrees, can be selected (e.g., about 25 degrees to about 75 degrees, about 30 degrees to about 70 degrees, about 35 degrees to about 65 degrees, about 45 degrees to about 65 degrees; about 50 degrees to about 60 degrees (e.g., about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 degrees) including intermediate values there between.

All or a portion of an engagement member front wall of an engagement member, or an engagement surface of a fastener member, sometimes is tapered. In some embodiments, all or substantially all of an engagement member front wall, or all or substantially of an engagement surface of a fastener member, is tapered from the first sidewall to the second sidewall. In certain embodiments, all or substantially all of an engagement member front wall is tapered from the proximal terminus (e.g., proximal terminus 226 shown in FIG. 23 is distally disposed to rim 210) to the distal terminus (e.g., distal terminus 227 shown in FIG. 23). In certain embodiments, all or substantially all of an engagement surface of a fastener member is tapered from the proximal terminus (e.g., proximal terminus 826 shown in FIG. 49) to the distal terminus (e.g., distal terminus 827 shown in FIG. 49).

In some embodiments, curvature of a curved surface is horizontally disposed on an engagement member front wall or on a fastener member engagement surface. In certain embodiments, curvature of an engagement member front wall is disposed perpendicular to longitudinal axis 297 shown in FIG. 18. In some embodiments, curvature of an engagement surface of a fastener member is disposed perpendicular to longitudinal axis 897 shown in FIG. 52.

In certain embodiments, a curved surface on an engagement member front wall initiates at or near the junction between the first side support and the front wall of the engagement member, and terminates at or near the junction between the second side support and the front wall of the engagement member. In some embodiments, a curved surface of the engagement member front wall is a concave curved surface as viewed opposite the engagement member front wall (i.e., from viewing perspective 299 shown in FIG. 23).

In some embodiments, a curved surface on a fastener member engagement surface initiates at or near the junction between the first sidewall and the engagement surface of the fastener member, and terminates at or near the junction between the second sidewall and the engagement surface of the fastener member. In some embodiments, a curved surface is a concave curved surface as viewed opposite the anterior external surface of the fastener member (i.e., from viewing perspective 899 shown in FIG. 57).

A curved surface sometimes has a radius of curvature of about 0.25 inches to about 5 inches (e.g., about 0.3 to about 0.7 inches; about 0.4 to about 0.6 inches. A curved surface sometimes is about 0.3, 0.35, 0.4, 0.45, 0.5, 0.55, 0.6, 0.65, 0.7, 0.8, 0.9, 1, 2, 3, 4 inches, including intermediate values there between.

Figure 18:
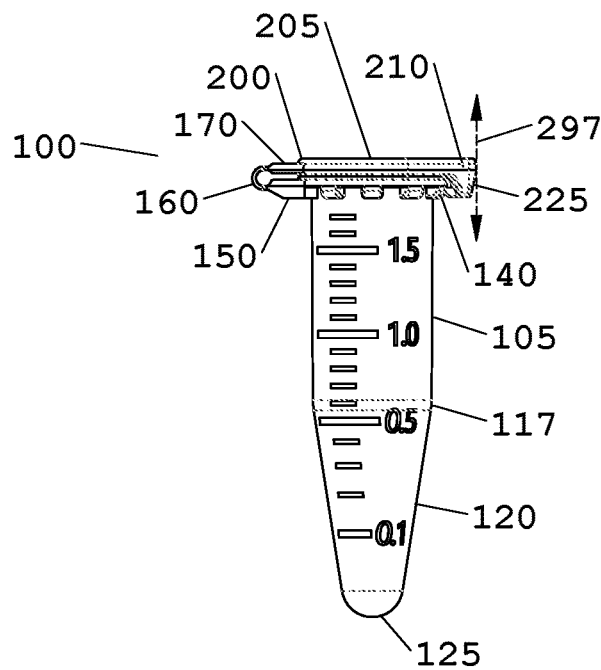
Figure 19:
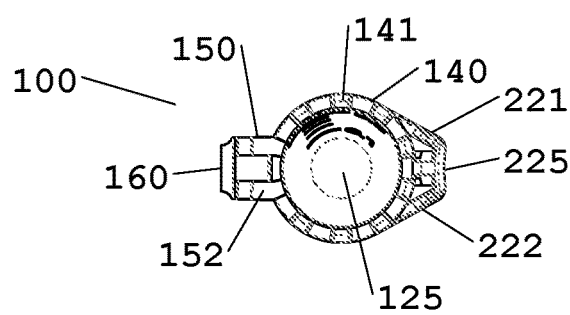
Figure 21:
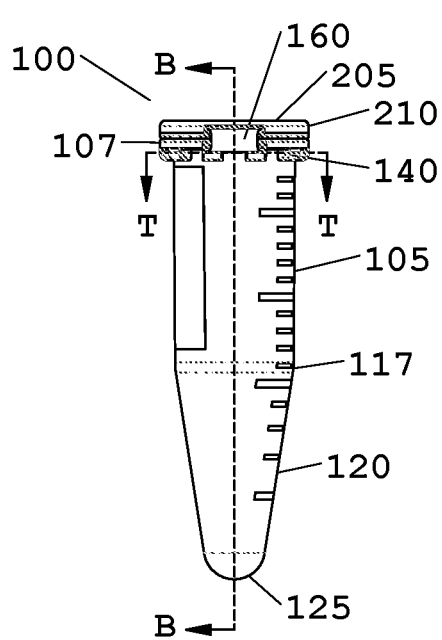
Figure 20:
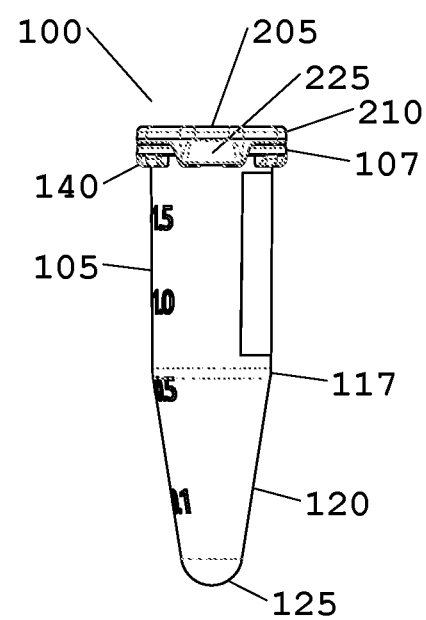

A non-limiting example of an engagement member that includes a radius and a taper is shown in fluid handling tube embodiment 100 as illustrated in FIG. 1 to FIG. 25, and in FIG. 16, FIG. 17, FIG. 19, FIG. 22 and FIG. 23, for example. Cap 200 includes engagement member front wall 225 and adjoining engagement member side supports 220, including first side support 221 and second side support 222. Cap 200 also includes front wall proximal terminus 226 and front wall distal terminus 227. As shown in FIG. 23, for example, engagement member front wall 225 includes an angled surface that tapers inwardly towards the nearest exterior surface of the tube body from front wall proximal terminus 226 to front wall distal terminus 227. As shown in FIG. 19, for example, engagement member front wall 225 includes a concave curved surface where the curvature extends from first side support 221 to second side support 222.

A non-limiting example of a fastener member that includes a radius and a taper is shown in fluid handling tube embodiment 700 as illustrated in FIG. 32 to FIG. 63, for example. Cap 800 includes fastener member front wall 811, engagement surface 825, and adjoining fastener member sidewalls 820, including first exterior sidewall 821 and second exterior sidewall 822. Cap 800 also includes engagement surface proximal terminus 826 and engagement surface distal terminus 827. As shown in FIG. 49, for example, engagement surface 825 is an angled surface that tapers inwardly, towards the nearest exterior surface of the tube body, from proximal terminus 826 to distal terminus 827. As shown in FIG. 47 and FIG. 49, for example, engagement surface 825 also is a concave curved surface where the curvature extends from first sidewall 821 to second sidewall 822.

All or a portion of an engagement surface sometimes is textured, which can facilitate engagement of an operator's finger or thumb with the surface. Any type of texture that enhances engagement, grip and/or friction between an operator's finger or thumb and the engagement surface can be selected, and in some embodiments, the engagement surface includes ridges 812 and troughs 813 (e.g., FIG. 49).

Ergonomic Hinge in Cap

Provided in some embodiments is a fluid handling tube that includes a cap, where the cap includes a tube sealing member, an anterior tube fastener member, and one or more channels (e.g., one or more furrows or grooves) between the sealing member and the fastener member. The one or more channels often define two regions of a cap: a tube fastener member of the cap located on the anterior side of the one or more channels, which often includes an operator engagement surface, and a cap body located on the posterior side of the one or more channels. A channel often includes a latitudinal opening (i.e., a latitudinal opening extending in the direction of, and parallel to, latitudinal axis 889), often disposed on the proximal surface of the cap and sometimes disposed on the distal surface of the cap. A channel often includes a major width (i.e., parallel to latitudinal axis 889A) and a minor width (i.e., parallel to axis 899; e.g., minor width 888A). A channel sometimes does not span the entire width of a cap, and sometimes terminates in the cap body and not at a cap rim exterior surface. A channel sometimes terminates at a cap rim exterior surface, and if the cap includes a bore, a channel sometimes terminates also at a bore interior side surface (e.g., 847 in FIG. 47 and FIG. 61). A bore often includes two opposing interior side surfaces, a first interior side surface and a second interior side surface. A bore sometimes traverses the thickness of the cap, and sometimes a first bore opening (i.e., proximal bore opening) is disposed at the proximal surface of the cap (e.g., proximal surface 805 in FIG. 47) and a second bore opening (i.e., distal bore opening) is disposed at the distal surface of the cap (e.g., distal surface 815 in FIG. 49). For embodiments in which there are two or more channels, the channels often are parallel to one another and often are co-linear. A cap sometimes includes a bore with two co-linear channels, where each channel is disposed on each side of the bore. In such embodiments, one channel sometimes terminates at the first bore interior side surface and the other channel sometimes terminates at the second bore interior side surface.

The major length of a channel generally is along the channel floor from one channel terminus to the other channel terminus. The major length of each channel often is parallel to (i) the major length of the junction between tether and cap to tether connector, and (ii) a latitudinal axis extending from one side of the cap to the other side of the cap and parallel to the major length of the junction between tether and cap to tether connector. The one or more channels often are disposed in the cap with the channel opening located at the proximal surface of the cap, and sometimes the one or more channels are disposed with the channel opening located at the distal surface of the cap. A channel terminus, or cross section of the one or more channels, can be of any suitable shape, non-limiting examples of which include U-shaped or V-shaped and/or with flat sidewalls, flat floor, curved sidewalls, curved floor, and combinations of the foregoing. For channel embodiments in which sidewalls are flat, sidewalls sometimes are parallel or substantially parallel to one another, sometimes are about perpendicular to the floor (e.g., angle of about 85 degrees to about 95 degrees; about 90 degrees to the floor) and sometimes are about 0.0001 degrees to about 55 degrees from a perpendicular extending from the center of the channel floor parallel to axis 897 (e.g., about 0.001, 0.01, 0.1, 1, 2, 3, 4, 5, 6, 7, 8, 9, 10, 15, 20, 25, 30, 35, 40, 45 or 55 degrees from the perpendicular).

A channel can be of any suitable depth, between a proximal surface of the cap to a distal surface of the cap, that reduces the force required to dissociate fasteners in the cap and tube body. A channel depth sometimes is measured from the channel floor to the channel opening. A channel opening sometimes is located at the cap proximal surface (e.g., at surface 840 or surface 841 for channel 843) and sometimes is located at the cap distal surface (e.g., 815). A channel depth sometimes is constant across the minor width of the channel (e.g., for a flat-bottom channel) and sometimes varies across the minor width of the channel (e.g., for a curved-bottom or stepped-bottom channel). In some embodiments, an actual, nominal, minor, major or average (e.g., mean, median, mode) channel depth is about 0.020 inches to about 0.040 inches, sometimes is about 0.025 inches to about 0.035 inches, and sometimes is about 0.030 inches.

Figures 62, 63:
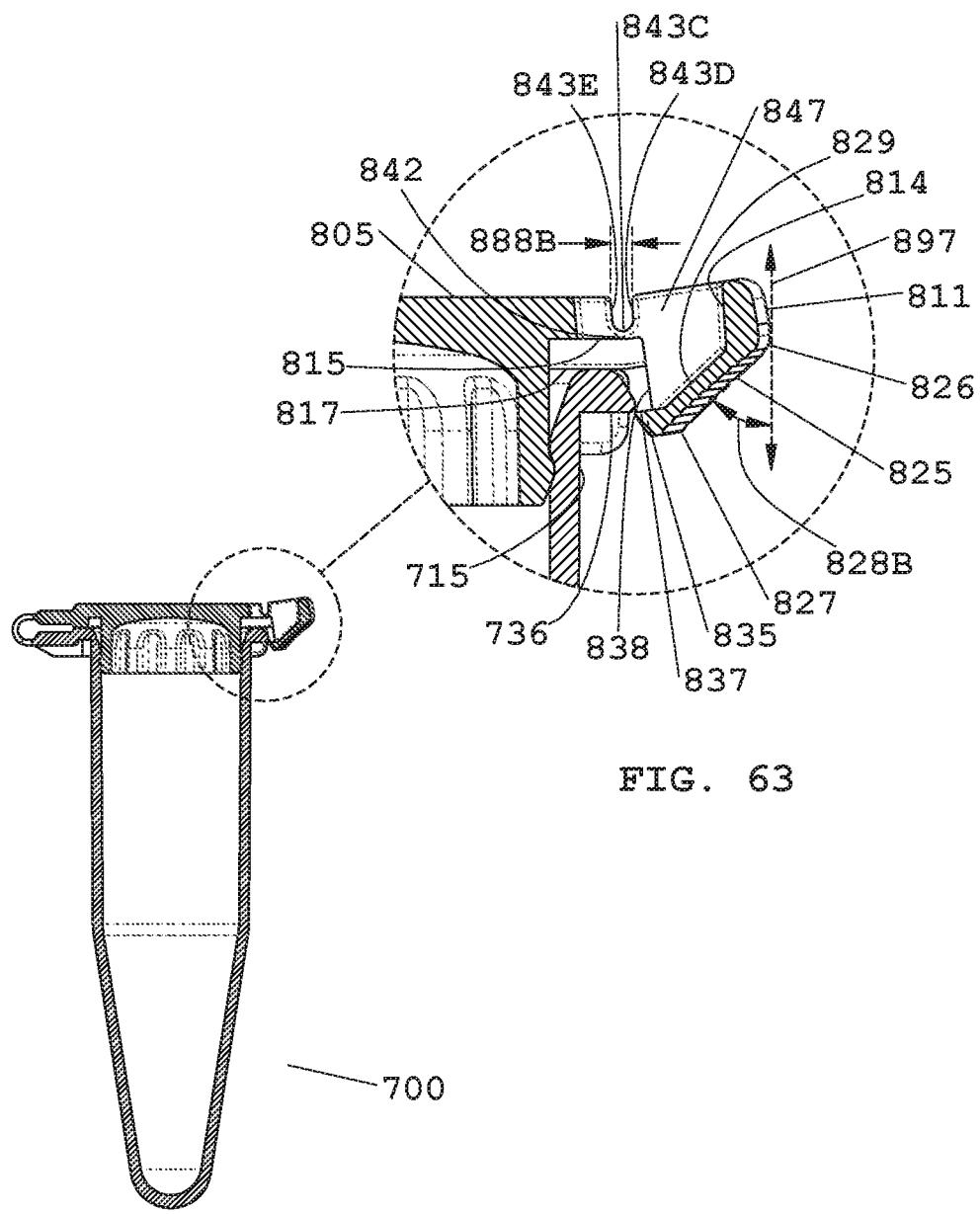
Figure 67:
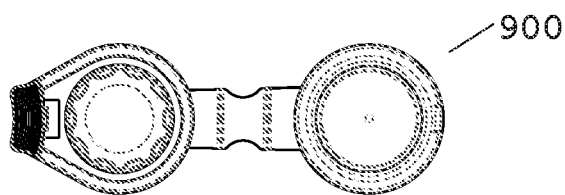
Figure 68:
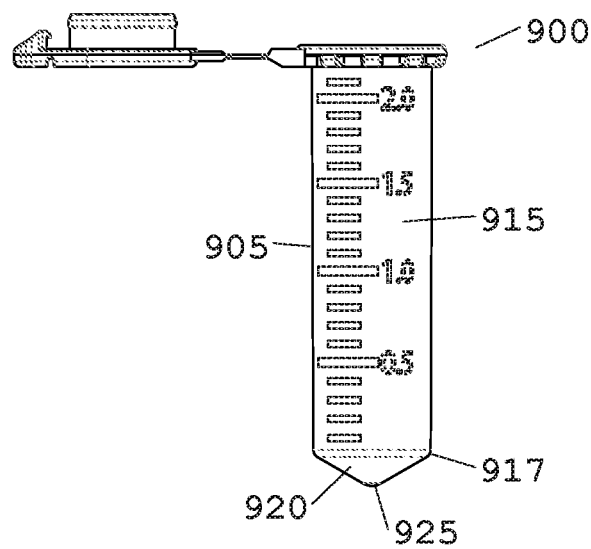
Figure 69:
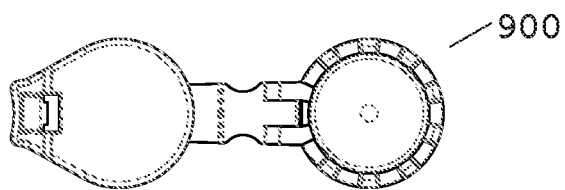
Figure 74:
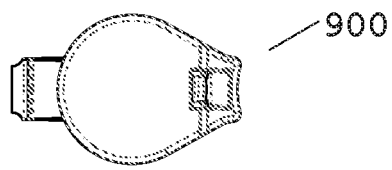
Figure 75:
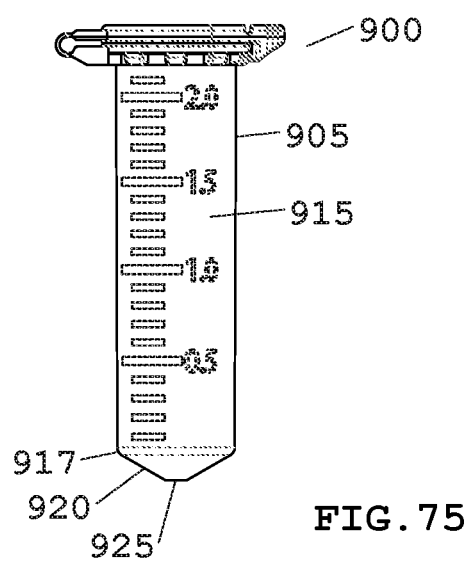
Figure 76:
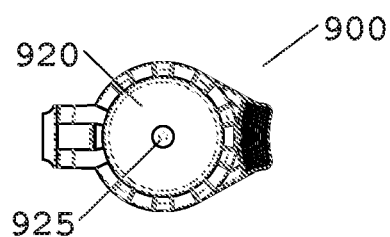

Material between a channel floor and a surface of the cap opposite the channel floor (e.g., on the distal surface of the cap) is of any suitable thickness (e.g., thickness of material 842 shown in FIG. 63 between channel floor 843C and cap distal surface 815). The thickness of such material sometimes is constant across the minor width of the channel (e.g., for a flat-bottom channel) and sometimes varies across the minor width of the channel (e.g., for a curved-bottom or stepped-bottom channel). The actual, nominal, maximum, minor, major or average (e.g., mean, median, mode) thickness of such material sometimes is about 0.002 inches to about 0.050 inches, sometime is about 0.005 inches to about 0.040 inches, sometimes is about 0.002 inches to about 0.020 inches, sometimes is about 0.004 inches to about 0.010 inches, sometimes is about 0.005 inches to about 0.009 inches, sometimes is about 0.006 inches to about 0.008 inches, sometimes is about 0.007 inches, sometimes is about 0.025 inches to about 0.050 inches, sometimes is about 0.028 inches to about 0.040 inches, sometimes is about 0.030 inches to about 0.036 inches, sometimes is about 0.032 inches to about 0.034 inches, and sometimes is about 0.033 inches. The thickness of such material sometimes is sometimes is about 0.002 inches to about 0.020 inches, sometimes is about 0.004 inches to about 0.010 inches, sometimes is about 0.005 inches to about 0.009 inches, sometimes is about 0.006 inches to about 0.008 inches, sometimes is about 0.007 inches. The thickness of such material sometimes is about 0.025 inches to about 0.050 inches, sometimes is about 0.028 inches to about 0.040 inches, sometimes is about 0.030 inches to about 0.036 inches, sometimes is about 0.032 inches to about 0.034 inches, and sometimes is about 0.033 inches.

Without being limited by theory, the one or more channels in the cap function as a hinge, often a living hinge, between the tube fastener member and the cap body, when a force is applied to the engagement surface in the proximal direction. A force applied to the engagement surface in the proximal direction often is an upward-directed force applied, for example, by an operator's finger or thumb. The angle between the engagement surface and a longitudinal axis often is reduced after and when the force is applied, compared to the angle before the force is applied. This reduction in this angle can be referred to as an angle of deflection. The angle between the engagement surface and a longitudinal axis sometimes is about 45 degrees to about 65 degrees, sometimes is about 50 degrees to about 60 degrees, and sometimes is about 55 degrees before the force is applied and when the fastener member of the cap is in a resting state. The angle of deflection sometimes is about 5 degrees to about 12 degrees, sometimes is about 7 degrees to about 12 degrees, sometimes is about 8 degrees to about 9 degrees, sometimes is about 8.5 degrees to about 8.9 degrees, and sometimes is about 8.7 degrees. The minor width of the channel at the channel opening often reduces after and when the force is applied compared to the minor width of the opening of the channel before the force is applied. The minor width of the opening of the channel, often located at the cap proximal surface, sometimes is about 0.020 inches to about 0.030 inches (e.g., about 0.025 inches) when the fastener member of the cap is in a resting state, and the minor width of the opening of the channel sometimes reduces by about 0.003 inches to about 0.006 inches (e.g., about 0.004 inches or about 0.005 inches) after and when the force is applied.

Without being limited by theory, the floor of the channel, often along the major length of the channel (i.e., along the channel floor from one channel terminus to the other channel terminus), can function as a flex point and pivot at which the channel anterior sidewall, or both channel walls (i.e., the channel anterior sidewall and channel posterior sidewall) swing or rotate. The cap distal surface and the distal surface of the cap rim often are flat or substantially flat before the force is applied and when the fastener member of the cap is in a resting state. These surfaces can deform from the flat or substantially flat orientation to a slightly curved orientation after and when the force is applied to the engagement surface of the tube fastener member in the cap. The flex point can allow the tube fastener member of the cap to pivot outwards, and rotation of the tube fastener member, with respect to the cap body, at the flex point in the channel can disassociate the fastener in the cap from the fastener engagement surface on the tube. Without being limited by theory, a flex point at each of the one or more channels can effectively reduce the amount of force required to disassociate the fastener in the cap from the fastener engagement surface on the tube, compared to the force required for this disassociation for a cap that does not include the one or more channels.

A fluid handling tube having a cap that includes a channel between the sealing member and the fastener member sometimes includes one or more of the following features (a), (b), (c) and (d): (a) panels and grooves in the sealing member that, without being limited by theory, facilitate sealing of the sealing member in the cap to the tube body and release of the sealing member in the cap from the tube body; (b) an ergonomic engagement surface in the cap; (c) condensation reducing cap configuration; and (d) enhanced sealing features. Non-limiting examples of these features are described herein. In certain embodiments, a sealing member of a cap sometimes includes grooves and panels. As non-limiting examples, grooves 863 and panels 865 are shown in FIG. 32 to FIG. 63. In some embodiments, a fastener member of a cap includes an ergonomically angled and curved engagement surface. As non-limiting examples, an ergonomically angled and curved engagement surface 825, which includes ridges 812 and troughs 813, is shown in FIG. 32 to FIG. 63. In certain embodiments, the sealing member in the cap includes a concave surface, which, without being limited by theory, reduces condensation that may form in the tube when the cap is in sealing engagement with the tube body, optionally in combination with a substantially planer surface located at the cap proximal surface. As non-limiting examples, a concave surface 890 and a substantially planer surface 805 are shown in FIG. 32 to FIG. 63. In some embodiments, the sealing member of the cap includes an annular protrusion, where an annular recess in the tube body aligns with and receives the annular protrusion, which, without being limited by theory, can enhance sealing between the sealing member of the cap and the tube body. As non-limiting examples, annular protrusion 853 and annular recess 733 are shown in FIG. 32 to FIG. 63.

A non-limiting example of a fluid handling tube embodiment that includes a living hinge in a cap is shown in FIG. 32 to FIG. 63 (i.e., fluid handling tube embodiment 700). In fluid handling tube 700, cap 800 includes tube sealing member 850, anterior tube fastener member 830, cap body 833, bore 845, engagement surface 825, and two co-linear and parallel channels 843A and 843B. Channels 843A and 843B are disposed on either side of bore 845 and are located between (i) fastener member 830 and (ii) each of the sealing member 850 and cap body 833. Channels 843A and 843B separate and define anterior tube fastener member 830 and cap body 833. The major length of each channel 843A and 843B often is parallel to (i) the junction between tether and cap to tether connector 765 and (ii) latitudinal axis 889 (e.g., FIG. 50). A channel opening of each of channels 843A and 843B is located at proximal surface 805 of cap 800. Each of channels 843A and 843B terminates at cap rim exterior surface 810 (i.e., channel terminus 844A and 844B) and at bore interior side surface 847 (i.e., channel terminus 844C and 844D). The cross section of each channel 843A and 843B is substantially U-shaped with substantially flat sidewalls 843D and 843E and floor 843C having a curved surface.

A force can be applied to the engagement surface 825 in proximal direction 898, which can be exerted, for example, by an operator's finger or thumb. Different orientations of tube members are shown (a) in FIG. 52, before such a force is applied (i.e., fastener member 830 is in a resting position when tube fastener member engagement surface 837 is engaged with fastener member engagement surface 736 of tube body 705), and (b) in FIG. 63, after the force is applied (fastener member 830 is in an extended position when tube fastener member engagement surface 837 is disengaged with fastener member engagement surface 736 of tube body 705). Application of the force to engagement surface 825 can reduce angle 828A, between surface 825 and longitudinal axis 897 (FIG. 52), to angle 828B (FIG. 63). Angle 828A sometimes is about 45 degrees to about 65 degrees, sometimes is about 50 degrees to about 60 degrees, and sometimes is about 55 degrees. The absolute value of the difference by subtraction between angle 828A and angle 828B (i.e., the angle of deflection) sometimes is about 8 degrees after and when the force is applied. The minor width 888A of channel 843 at the channel opening before such a force is applied (FIG. 52) often reduces to minor width 888B after and when the force is applied (FIG. 63). Minor width 888A of the opening of channel 843 sometimes is about 0.023 inches, and the difference by subtraction between minor width 888A and minor width 888B of the opening of channel 843 sometimes is about 0.004 inches.

Cap 800 includes two channels (i.e., 843A and 843B) each of which can function as a living hinge. Without being limited by theory, floor 843C of channel 843A and channel 843B can function as a flex point and pivot at which channel anterior sidewall 843D can displace (i.e., rotate) towards channel posterior wall 843E after and when the force is applied. Cap distal surface 815 and distal surface 817 of cap rim 809 often are flat or substantially flat before the force is applied, and these surfaces 815 and 817 can deform to a slightly curved orientation after and when the force is applied. The flex point can permit anterior tube fastener member 830, which includes engagement surface 837, to pivot outwards after and when the force is applied. Rotation of member 830, with respect to cap body 833, which can occur at the flex point, can disassociate fastener engagement surface 837 in cap 800 from fastener engagement surface 736 on tube body 705, thereby facilitating disengagement of cap sealing member 850 from sealing region 738 tube interior 730.

Condensation Reducing Cap Configurations

Provided in certain embodiments are tubes that include a tube body and a cap, which tube body includes an exterior surface and an interior surface. The cap includes a proximal surface, a distal surface and a tubular sealing member protruding from the distal surface. The sealing member often includes a distal terminus opposite the distal surface of the cap, an interior surface, and a substantially smooth exterior surface configured to seal with the interior surface of the tube body. A proximal surface of the sealing member, surrounded by the tubular sealing member wall, can include a concave surface, and the proximal surface of the cap can be flat. A concave surface can be viewed opposite the proximal surface of the sealing member (e.g., viewing proximal surface 290 from viewing perspective 291 shown in FIG. 11; viewing proximal surface 890 from viewing perspective 891 shown in FIG. 42). In certain embodiments, the distal surface of the cap outside the tubular sealing member is flat (e.g., distal surface 215 shown in FIG. 2 is flat; distal surface 815 shown in FIG. 33 is flat).

In some embodiments, the interior surface of the tubular sealing member includes a plurality of panels, each panel includes a panel face and a panel side, the panel side includes a curved portion, the concave curved surface of the proximal portion of the tubular sealing member includes a radius of curvature located at the panel side, and the curved portion of the panel side includes a radius of curvature equal to the radius of curvature of the concave curved surface of the proximal portion of the tubular sealing member located at the panel surface side. For example, in certain embodiments sealing member interior wall 255 includes curved proximal portion 290, and in some embodiments sealing member interior wall 855 includes curved proximal portion 890. In certain embodiments, proximal portion 290 of the interior wall at panel curved portion 282 has the same radius of curvature at curved portion 282, and in some embodiments proximal portion 890 of the interior wall at panel curved portion 882 has the same radius of curvature at curved portion 882. In some embodiments, the radius of curvature of the concave curved surface of the proximal portion of the tubular sealing member (e.g., interior surface proximal portion 290 shown in FIG. 13; interior surface proximal portion 890 shown in FIG. 44) is about 0.1 inches to about 1 inch (e.g., about 0.2 inches to about 0.8 inches; about 0.3 inches to about 0.7 inches; about 0.4 inches to about 0.6 inches; about 0.2, 0.3, 0.4, 0.5, 0.6, 0.7, 0.8, 0.9 inches; and intermediate values there between). Without being limited by theory, the radius of curvature of the interior surface proximal portion surrounded by the tubular sealing member of the cap reduces the amount of condensation on the interior surface of the cap within the sealing member, caused by vapor rising from a liquid residing in the tube body, as compared to a cap that does not include such a radius of curvature.

In addition to advantages provided by a curved sealing member interior surface, cap embodiments provided herein also include a concomitant advantage of providing an exterior proximal surface that is flat or substantially flat. A flat or substantially flat cap proximal exterior surface can facilitate (i) marking of the fluid handling tube (e.g., application of a label and/or writing (e.g., in ink) to the proximal exterior surface), (ii) association of the cap to the tube body (e.g., by providing a wider flat engagement surface against which an operator's finger may press rather than a smaller convex exterior surface), and (iii) can facilitate storage of the fluid handling tube (e.g., upside down storage of the cap surface on a flat surface).

Enhanced Sealing Configurations

Provided in certain embodiments are tubes that include a tube body and a cap, which tube body includes an exterior surface and an interior surface. The cap includes a proximal surface, a distal surface and a tubular sealing member protruding from the distal surface. The sealing member often includes a distal terminus opposite the distal surface of the cap, an interior surface, and a substantially smooth exterior surface configured to seal with the interior surface of the tube body. The substantially smooth exterior surface of the tubular sealing member sometimes includes an annular protrusion, and the interior surface of the tube body sometimes includes an annular recess, where the annular recess in the tube body is configured to receive the annular protrusion of the tubular sealing member of the cap. In some embodiments, the tubular sealing member of the cap is inserted in the tube body and is sealed in the tube body, and the annular protrusion and the annular recess are aligned and joined in a sealing zone (i.e., sealing region). Without being limited by theory, aligning and joining the annular protrusion and the annular recess in the sealing region provides a seal with a sealing force greater than a sealing force afforded by a comparable fluid handling tube that includes no annular recess and no annular protrusion in the sealing region.

The interior diameter of the annular recess sometimes is smaller than the exterior diameter of the annular protrusion at one or more contact points between the recess and protrusion, and sometimes the annular recess and annular protrusion join in an interference fit. In some embodiments, the major interior diameter of the annular recess is about 0.0001 inches to about 0.001 inches less than the major exterior diameter of the annular protrusion. In certain embodiments, the interior diameter of the annular recess is the same or about the same as the exterior diameter of the annular protrusion at one or more contact points between the recess and the protrusion. The annular recess and the annular protrusion often are curved and sometimes the annular recess and the annular protrusion each have a radius of curvature that is the same or substantially the same. In some embodiments, the annular recess and the annular protrusion each are curved and each sometimes includes a radius of curvature that independently is about 0.015 inches to about 0.035 inches at a surface that contacts the other (e.g., about 0.020 inches to about 0.030 inches; about 0.022 inches to about 0.026 inches; about 0.020, 0.021, 0.022, 0.023, 0.024, 0.025, 0.026, 0.027, 0.028, 0.029, 0.030 inches). In some embodiments, the maximum distance that the annular protrusion protrudes from the exterior sidewall of the sealing member, and the maximum distance that the annular recess recesses from the interior surface of the tube body, independently is about 0.001 inches to about 0.005 inches (e.g., about 0.002 inches, 0.0025 inches, 0.003 inches, 0.0035 inches, 0.004 inches).

Figure 45:
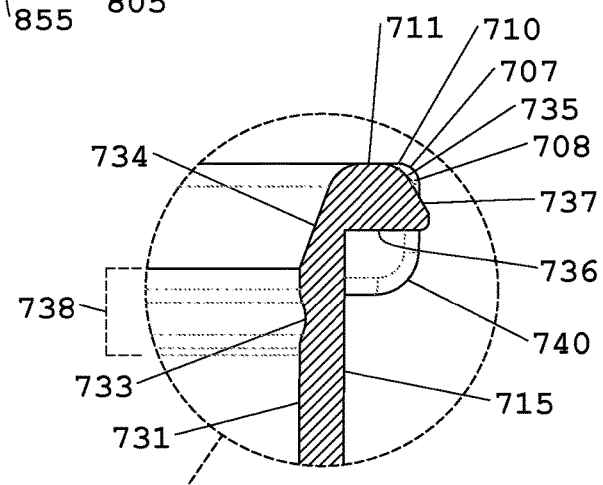
Figure 43:
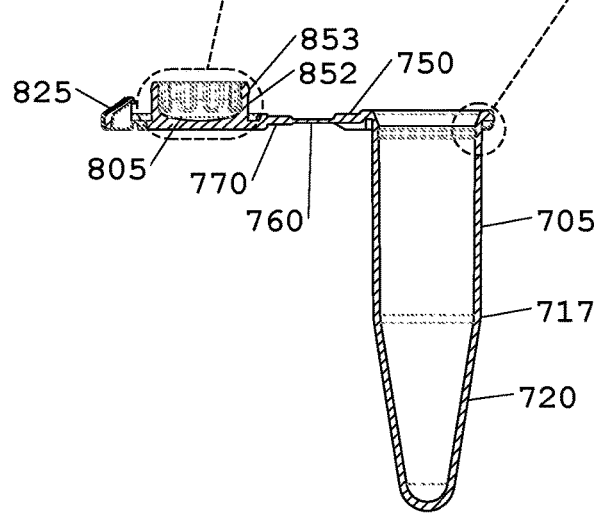
Figure 55:
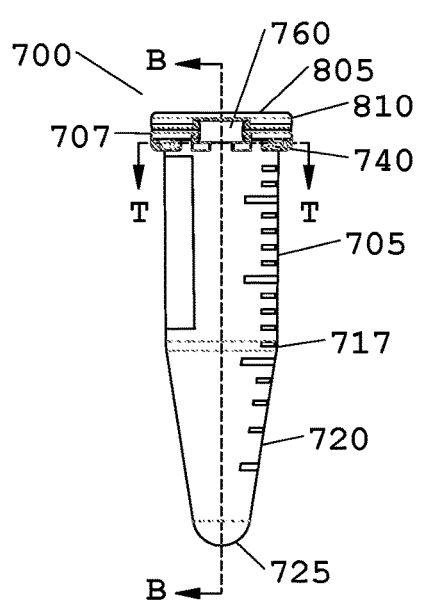
Figure 54:
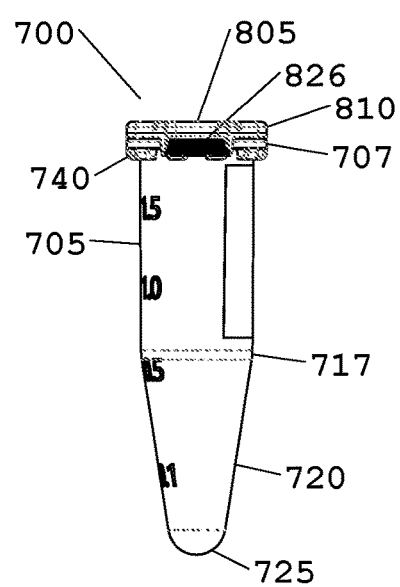
Figure 61:
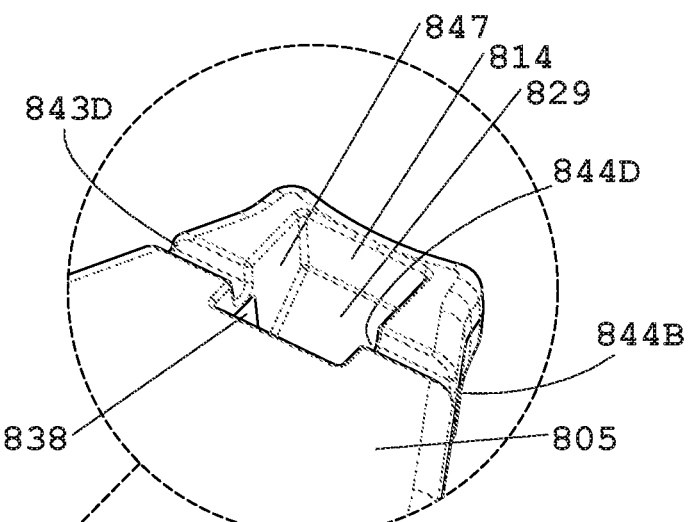
Figure 60:
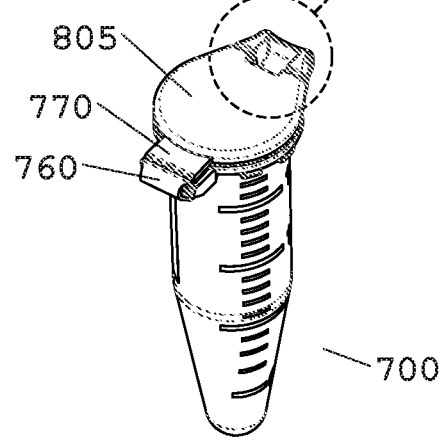

A non-limiting example of a fluid handling tube having an enhanced sealing region configuration is illustrated in FIG. 23 and FIG. 24. FIG. 24 shows sealing region 138 shown in FIG. 14. As shown in FIG. 14, tube body 105 includes exterior wall 115, rib 140, interior wall 131, sloped surface 134, and annular recess 133. Also as shown in FIG. 24, cap 200 includes annular protrusion 253 on sealing member 250, where annular recess 133 aligns with and receives annular protrusion 253. Another non-limiting example of a fluid handling tube having an enhanced sealing region configuration is illustrated in FIG. 57 and FIG. 58. FIG. 58 shows sealing region 738 shown in FIG. 45. As shown in FIG. 45, tube body 705 includes exterior wall 715, rib 740, interior wall 731, sloped surface 734, and annular recess 733. Also as shown in FIG. 58, cap 800 includes annular protrusion 853 on sealing member 850, where annular recess 733 aligns with and receives annular protrusion 853.

Certain Tube Embodiments

Tube embodiments described above can include one or more of the following features.

In certain embodiments, a tube body comprises circumferentially disposed ribs. An element typically is arranged circumferentially, or is circumferentially disposed, around a virtual circle contacting a surface of another element. For example, ribs 140 shown in FIG. 1 are circumferentially disposed around a virtual circle contacting the exterior surface of proximal portion 115 of tube body 105 at or near rim distal surface 112 (and 141). Also, for example, ribs 740 shown in FIG. 32 and FIG. 48 are circumferentially disposed around a virtual circle contacting the exterior surface of proximal portion 715 of tube body 705 at or near rim distal surface 712 (and 741). A tube body can include any suitable number of ribs and sometimes includes about 3 to about 50 ribs (e.g., about 5 to about 40 ribs, about 5 to about 30 ribs, about 5 to about 25 ribs, about 5 to about 20 ribs, or about 5 to about 15 ribs, about 5 to about 10 ribs). A rib can be of any suitable geometry and can have any suitable number of contact areas on a tube body for imparting rigidity to a tube body rim and/or tube body sidewall. Non-limiting examples of rib profiles include circular, oval, quadrilateral, square, rectangular, trapezoid, rhomboid, parallelogram, triangular, star, polygon, pentagon and hexagon. Ribs sometimes have beveled or eased edges and can have one, two, three or more contact areas on a tube body. Ribs often are in contact with a distal surface of a rim and/or a proximal exterior surface of a tube body at or near the rim. Ribs sometimes are spaced symmetrically around a circumference, and sometimes spaces between ribs are the same or substantially the same on a tube body. In some embodiments, 2, 3, 4, 5, 6 or more spaces between ribs on a tube body are not equal.

Non-limiting examples of rib embodiments are depicted in fluid handling tube embodiment 100 shown in FIG. 1 to FIG. 25. Tube body 105 includes a plurality of ribs 140, where a portion of each rib can be in contact with (e.g., molded to) rim distal surface 112 (or 141). A portion of each rib also can be in contact with (e.g., molded to), and can be arranged circumferentially around, proximal portion 115 of the tube body. Non-limiting examples of rib embodiments also are depicted in fluid handling tube embodiment 700 shown in FIG. 32 to FIG. 63. Tube body 705 includes a plurality of ribs 740, where a portion of each rib can be in contact with (e.g., molded to) rim distal surface 712 (or 741). A portion of each rib also can be in contact with (e.g., molded to), and can be arranged circumferentially around, proximal portion 715 of the tube body.

For embodiments in which a sealing member includes grooves, and a cap is engaged with a tube body of a fluid handling tube with the sealing member of the cap inserted in the tube body, each of the ribs on the tube body sometimes is disposed across from a groove in the sealing member. As shown in FIG. 25, for example, ribs 140 are disposed opposite grooves 263 in the sealing member interior of the cap. Without being limited by theory, ribs 140 in the tube body can impart structural rigidity in the tube body opposite thinner wall sections of the sealing member (i.e., at the grooves in the sealing member), thereby facilitating compression of the grooves and overall compression of the sealing member. Also without being limited by theory, panels 265 in the sealing member can impart structural rigidity to the sealing member opposite thinner wall sections of the tube body (i.e., at proximal portions 115 of tube body 105 where there are no ribs 140), thereby enhancing structural integrity of the sealing member and/or the tube body when the cap is engaged with the tube body. Similarly, as shown in FIG. 59, for example, ribs 740 are disposed opposite grooves 863 in the sealing member interior of the cap. Without being limited by theory, ribs 740 in the tube body can impart structural rigidity in the tube body opposite thinner wall sections of the sealing member (i.e., at the grooves in the sealing member), thereby facilitating compression of the grooves and overall compression of the sealing member. Also without being limited by theory, panels 865 in the sealing member can impart structural rigidity to the sealing member opposite thinner wall sections of the tube body (i.e., at proximal portions 715 of tube body 705 where there are no ribs 740), thereby enhancing structural integrity of the sealing member and/or the tube body when the cap is engaged with the tube body.

While fluid handling tube embodiment 100 shows an arrangement in which grooves in the sealing member can facilitate compression of the sealing member within tube body 105, other arrangements that permit expansion of the tube body upon insertion of the sealing member can be manufactured. In such embodiments, wall sections in the tube body between ribs 140 can be thinner than depicted in embodiment 100, thereby effectively forming grooves in wall sections between ribs in the tube body, that can facilitate expansion when a sealing member of a cap is inserted in the tube body. In such embodiments, a sealing region can include or not include panels and grooves. Similarly, while fluid handling tube embodiment 700 shows an arrangement in which grooves in the sealing member can facilitate compression of the sealing member within tube body 705, other arrangements that permit expansion of the tube body upon insertion of the sealing member can be manufactured. In such embodiments, wall sections in the tube body between ribs 740 can be thinner than depicted in embodiment 700, thereby effectively forming grooves in wall sections between ribs in the tube body, that can facilitate expansion when a sealing member of a cap is inserted in the tube body. In such embodiments, a sealing region can include or not include panels and grooves.

In some embodiments, fluid handling tubes include fastener members that can fasten a cap to a tube body. A cap can include a fastener member and the tube body can include a fastener member counterpart. Where a sealing member of a cap is engaged with an interior surface of the tube, a fastener member on or in the cap often is aligned with, and can engage with, a fastener member counterpart on or in the tube body. Any suitable fastener and fastener counterpart can be selected for inclusion in or on the cap and tube body.

For a fluid handling tube having a cap that includes an engagement member front wall (e.g., 225), a fastener of the cap can extend from the rear of the engagement member front wall in certain embodiments, and can extend from the distal portion of the front wall. For a fluid handling tube having a cap that includes an engagement surface (e.g., 825), a fastener of the cap can extend from an external posterior wall in certain embodiments (e.g., posterior wall 838). A fastener member of a cap sometimes includes a protrusion (e.g., protrusion 235, 835), and sometimes a fastener member of a cap includes a support member extending from the protrusion (e.g., support 240). A support member can be of any suitable shape and sometimes is a rib extending from a distal surface of a protrusion. A protrusion can be of any suitable shape, and sometimes includes one or more flat surfaces and/or one or more curved surfaces. A fastener member of a cap that includes a protrusion sometimes functions as a latch, and the protrusion often is configured to contact a surface of the fastener member counterpart of the tube body and releasably attach to the fastener member counterpart.

In certain embodiments, a cap includes a bore extending from the proximal surface to the distal surface of the cap, where the bore sometimes is adjacent to the fastener member of the cap. A portion of a bore sometimes extends from a rear portion of an engagement member front wall located in the cap. A bore sometimes projects through, or partially through, a cap. A bore sometimes projects through cap body and fastener member portions of a cap. A bore often is located outside the sealing member, and can include an opening of any suitable shape, non-limiting examples of which include circular, oval, quadrilateral, square, rectangular, trapezoid, rhomboid, parallelogram, triangular, star, polygon, pentagon and hexagon. A bore can include one or more walls that are perpendicular or substantially perpendicular to the proximal surface of the cap, and sometimes includes one or more walls that are tapered or flared from the proximal surface to the distal surface of the cap at a suitable angle. A bore containing tapered walls has an opening at the proximal surface of the cap that is larger than the opening at the distal surface of the cap, and a bore containing flared walls has an opening at the proximal surface of the cap that is smaller than the opening at the distal surface of the cap. Tapered or flared bore walls are at an angle that deviates from a perpendicular from the proximal surface of the cap by about 0.5 degrees to about 60 degrees in some embodiments (e.g., about 1 degree to about 20 degrees deviation from perpendicular; about 1 degree to about 10 degrees deviation from perpendicular; about 2 degrees to about 8 degrees deviation from perpendicular; about 2, 3, 4, 5, 6, 7, 8, 9 degrees deviation from perpendicular; and intermediate values there between). A bore in some embodiments can provide clearance for deflection of a fastener member located on a cap (e.g., a support member) within the bore, and can thereby increase fastener flexibility and enhance user operability.

A tube body can include a fastener member located at or near a rim of the tube body. A rim of a tube body sometimes is interrupted by a fastener member and sometimes one or more portions of a fastener member can be at the same elevation as a portion of the rim (e.g., proximal surface of the rim). A fastener located on or in the tube body often includes an engagement surface for the fastener counterpart on or in the cap, which engagement surface sometimes extends perpendicular, or substantially perpendicular (i.e., about 1 degree to about 10 degree deviation from perpendicular) from an exterior surface of the tube body. For example, surface 136 of the fastener extends perpendicular to the exterior surface 115 of the tube body as shown in FIG. 14. An engagement surface of a fastener located in or on a tube body often is not associated directly with a rib (e.g., rib 140 shown in FIG. 14), and sometimes is located near a rib extending from a rim. A fastener located on or in the tube body sometimes includes a sloped surface that can facilitate engagement of a fastener counterpart on or in a cap. Such a sloped surface can be at any suitable angle, and sometimes deviates from a perpendicular extending from a horizontal distal surface of the fastener (e.g., a perpendicular extending from surface 136 in FIG. 14) by about 1 degree to about 70 degrees (e.g., deviates from the perpendicular by about 5 degrees to about 60 degrees; deviates from perpendicular by about 10 degrees to about 50 degrees; deviates from perpendicular by about 20 degrees to about 40 degrees; deviates from perpendicular by about 25 degrees to about 30 degrees; deviates from perpendicular by about 26, 27, 28, 29, 30, 31, 32, 33, 34 degrees; and intermediate values there between).

Non-limiting examples of fastener embodiments are depicted in fluid handling tube embodiment 100 shown in FIG. 1 to FIG. 25. As shown in FIG. 14, for example, cap fastener member 135 on tube body 105 includes fastener member engagement surface 136, fastener member sloped surface 137, and fastener member proximal surface 111 located at the same elevation on tube body 105 as rim proximal surface 110. Side 108 of tube rim 107 is revealed at each fastener-rim junction in the tube body and at sloped surface 137. As shown in FIG. 2 and FIG. 23, for example, tube fastener member 230 on cap 200 extends from distal terminus 227 of engagement member front wall 225, and includes fastener member protrusion 235, fastener member engagement surface 237, and fastener member support member 240. Bore 245, having cap bore edge 247, can provide clearance for support member 240 and thereby permit flexion of fastener member 230.

Non-limiting examples of fastener embodiments also are depicted in fluid handling tube embodiment 700 shown in FIG. 32 to FIG. 63. As shown in FIG. 45, for example, cap fastener member 735 on tube body 705 includes fastener member engagement surface 736, fastener member sloped surface 737, and fastener member proximal surface 711 located at the same elevation on tube body 705 as rim proximal surface 710. Side 708 of tube rim 707 is revealed at each fastener-rim junction in the tube body and at sloped surface 737. As shown in FIG. 33, FIG. 38, FIG. 47, FIG. 49 and FIG. 57, for example, tube fastener member 830 of cap 800 extends from distal terminus 827 of engagement surface 825, and includes fastener member protrusion 835, and fastener member engagement surface 837. Bore 845, through cap fastener member 830 and cap body 833, can define bore interior sidewall 847 of fastener member 830, bore interior sidewall 846 of cap body 833, posterior sidewall 836 of cap body 833, perimeter 848 at proximal surface 805 of the cap body, perimeter 849 at proximal surface 831 of fastener member 830, an opening at cap distal surface 815, and channel termini 844C and 844D of each of channels 843A and 843B, respectively. Bore 845 also can define internal anterior sidewall 814 and internal inclined wall 829 of fastener member 830, where wall 829 inclines from fastener member engagement surface 837 to anterior sidewall 814. The exterior of fastener member 830 also can include posterior wall 838 and sidewalls 820.

In some embodiments, a fluid handling tube can include a connector that connects a cap to the tube body when the cap is not in sealing attachment with the tube body. A connector that connects a cap to a tube body in such embodiments is a different structural element than a sealing member in the cap that can be inserted in the tube body and is different than a fastener member latch or protrusion. In some embodiments, a tube-to-cap connector includes a flexible tether connected to the cap and the tube body that can deform and bend when the cap is associated with, or disassociated from, the tube body. A tether sometimes includes a hinge portion that facilitates association of the cap with, or disassociation of the cap from, the tube body. A tether can include a flexible element having any suitable geometry for cap association and disassociation from a tube body, and sometimes the flexible element includes a strip, bar, one or more portions of increased or decreased thickness, the like or combination thereof. In certain embodiments, a tube-to-cap connector includes a cap-to-tether connector and/or a tube-to-tether connector, which can be in connection with any suitable region of a cap or tube body (e.g., a cap rim, tube rim, exterior surface of tube body). A cap-to-tether connector and/or a tube-to-tether connector in some embodiments includes a support element that effectively increases the thickness of the connector and strengthens and supports the connector. Such a support element sometimes is connected to, or optionally molded with, a portion of the cap or the tube body (e.g., a cap rim, tube rim, exterior surface of tube body). A tether and any other element of a tube-to-cap connector can include, and/or can be manufactured from, the same material from which the cap and/or the tube body is manufactured, and sometimes is manufactured from, or includes a material different than, the material used to manufacture the cap or the tube body.

A non-limiting example of a tube-to-cap connector is shown in fluid handling tube embodiment 100 illustrated in FIG. 2, FIG. 18, FIG. 19, FIG. 23 and FIG. 25, for example. A tube-to-cap connector can include tube-to-tether connector 150, tether 160, cap-to-tether connector 170. As shown in FIG. 18, tether 160 can bend from a substantially linear form to a substantially U-shaped form and effectively function as a hinge. As shown in FIG. 19, FIG. 23 and FIG. 25, tube-to-tether connector can include supports 152 that are in connection with, and optionally molded to, an exterior surface of the tube body (e.g., tube body exterior wall 115). As shown in FIG. 2, cap-to-hinge connector 170 can be in connection with, and can optionally be molded to, cap rim 210.

Another non-limiting example of a tube-to-cap connector is shown in fluid handling tube embodiment 700 illustrated in FIG. 33, FIG. 51, FIG. 53, FIG. 57 and FIG. 59, for example. A tube-to-cap connector can include tube-to-tether connector 750, tether 760, cap-to-tether connector 770. As shown in FIG. 51, tether 760 can bend from a substantially linear form to a substantially U-shaped form and effectively function as a hinge. As shown in FIG. 53, FIG. 57 and FIG. 59, tube-to-tether connector can include supports 752 that are in connection with, and optionally molded to, an exterior surface of the tube body (e.g., tube body exterior wall 715). As shown in FIG. 33, cap-to-hinge connector 770 can be in connection with, and can optionally be molded to, cap rim 810.

Fluid handling tubes described herein can be configured to contain any suitable volume of material (e.g., fluid, solid, slurry or combination thereof). In certain embodiments, a fluid handling tube can contain a maximum volume, when the cap is in sealing engagement with the tube body, of about 0.1 milliliters to about 5 milliliters, about 0.2 milliliters to about 1.0 milliliters, about 0.3 milliliters to about 0.9 milliliters, about 0.4 milliliters to about 0.8 milliliters, about 0.5 milliliters to about 0.7 milliliters, or about 0.6 milliliters, and sometimes such a tube is of the same or similar configuration as tube embodiment 100, tube embodiment 300, tube embodiment 500, tube embodiment 700 or tube embodiment 900, for example. In some embodiments, a fluid handling tube can contain a maximum volume, when the cap is in sealing engagement with the tube body, of about 1.2 milliliters to about 2.0 milliliters, about 1.3 milliliters to about 1.9 milliliters, about 1.4 milliliters to about 1.8 milliliters, about 1.5 milliliters to about 1.7 milliliters, or about 1.6 milliliters, and sometimes such a tube is of the same or similar configuration as tube embodiment 100, tube embodiment 300, tube embodiment 500, tube embodiment 700 or tube embodiment 900, for example. In certain embodiments, a fluid handling tube can contain a maximum volume, when the cap is in sealing engagement with the tube body, of about 1.5 milliliters to about 2.5 milliliters, about 1.7 milliliters to about 2.3 milliliters, about 1.8 milliliters to about 2.2 milliliters, about 1.9 milliliters to about 2.1 milliliters, or about 2.0 milliliters, and sometimes such a tube is of the same or similar configuration as tube embodiment 100, tube embodiment 300, tube embodiment 500, tube embodiment 700, or tube embodiment 900, for example. Fluid handling tubes described herein can be configured for any suitable use, non-limiting examples of which include use in a centrifuge (e.g., micro-centrifuge)

and use for containing nucleic acid amplification reactions (e.g., polymerase chain reaction amplification).

An exterior surface of a tube body of a fluid handling tube sometimes includes one or more of the following: volumetric graduation markings, volume indicators and a writing panel. An exterior surface of a tube body of a fluid handling tube sometimes does not include volumetric graduation markings, volume indicators and a writing panel. Volumetric graduation markings generally include one or more volume level markers indicating a volume level of a fluid contained in a tube body. Numerical volume indicators sometimes are designated on a tube body in association with applicable graduation markings. Non-limiting examples of volumetric graduations are illustrated in FIG. 1 for example, which shows volume level markers at 0.1 milliliter, 0.5 milliliter, 1.0 milliliter and 1.5 milliliter numerical volume indicators, and less prominent volumetric graduation markings for volumes between 0.1 milliliters to 0.5 milliliters, 0.5 milliliters to 1.0 milliliters, 1.0 milliliters to 1.5 milliliters and greater than 1.5 milliliters. Volumetric graduation markings and/or volume indicators can be indicated on or in a tube body in any suitable manner. Volumetric graduation markings and/or volume indicators sometimes are embossed on a tube body surface, sometimes are recessed in a tube body surface, sometimes are etched into a tube body surface, and sometimes are applied in ink to a tube body surface, which tube body surface may be an interior surface and/or an exterior surface. A writing panel generally is located on a portion of an exterior surface of a tube body. A writing panel sometimes includes a coating of a material suitable for receiving ink. A writing panel sometimes includes a surface having a texture different than a portion of a tube exterior surface not within the writing panel (e.g., textured surface, etched surface). A writing panel sometimes is a region of a tube exterior delineated by a visual border, where the surface of the portion of the tube exterior within the border is the same or different than a portion of the tube exterior surface outside the border. A border sometimes is embossed on a tube body surface, sometimes is recessed in a tube body surface, sometimes is etched into a tube body surface, and sometimes is applied in ink to a tube body surface, which tube body surface may be an interior surface and/or an exterior surface. Volumetric graduation markings 113, 113A, 113B, 313, 313A, 313B, 513, 513A, 513B, 713, 713A and 713B, volume indicators 114, 314, 514 and 714, and/or writing panel 116 and 716 shown in the drawings submitted herewith are optional.

Methods of Manufacture

A fluid handling tube described herein may be manufactured by any suitable process. Non-limiting examples of manufacturing processes include thermoforming, vacuum forming, pressure forming, plug-assist forming, reverse-draw thermoforming, matched die forming, extrusion, casting and injection molding.

A tube body, a cap, a sealing member in the cap and a tube-to-cap connector of a fluid handling tube independently can include, and can be manufactured from, the same or different material. In some embodiments, all elements of a fluid handling tube are manufactured from the same material. Some or all elements of a fluid handling tube sometimes include, or are manufactured from, a suitable polymer or polymer mixture. Non-limiting examples of polymers include low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE). One or more elements of a fluid handling tube can include, or can be manufactured from, a recyclable material and/or degradable material (e.g., a bio-degradable material), non-limiting examples of which are disclosed in International Application no. PCT/US2009/063762 filed on Nov. 9, 2009 and published as WO 2010/054337 on May 14, 2010. One or more elements of a fluid handling tube, in some embodiments, include an anti-microbial agent, non-limiting examples of which are disclosed in International Application no. PCT/US2009/047541 filed on Jun. 16, 2009 and published as WO 2010/008737 on Jan. 10, 2010 (e.g., antimicrobial metal (e.g., silver)).

A fluid handling tube sometimes is manufactured by a method that includes: providing a mold configured to form features of a tube described herein; introducing a moldable polymer mixture to the mold; curing the polymer mixture in the mold, thereby forming the fluid handling tube; and releasing the fluid handling tube from the mold. In certain embodiments, a method for manufacturing a fluid handling tube described herein includes: contacting a mold having an interior cavity configured to mold a fluid handling tube of described herein with a molten polymer; hardening the polymer in the mold, thereby forming the fluid handling tube in the mold; and ejecting the fluid handling tube from the mold. One or more or all elements of a fluid handling tube (e.g., tube body, a cap, a sealing member in the cap and a tube-to-cap connector) may be molded as a single unit, or can be attached after individual elements are molded. A mold sometimes includes or is manufactured from a metal, which sometimes is or includes aluminum, zinc, steel or a steel alloy. A polymer utilized in a molding process sometimes is a polymer described herein.

Also provided herein in certain embodiments is a mold for manufacturing a fluid handling tube described herein by a molding process (e.g., injection molding process), which includes a body that forms exterior surfaces of the fluid handling tube and a member that forms interior surfaces of the fluid handling tube. A mold sometimes includes one or more core pin components that form interior surfaces of the tube.

A fluid handling tube sometimes is manufactured by an injection molding process. Injection molding is a manufacturing process for producing objects from thermoplastic (e.g., nylon, polypropylene, polyethylene, polystyrene and the like, for example) or thermosetting plastic (e.g., epoxy and phenolics, for example) materials. A plastic material (e.g., a polymer material) of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method often ensures the complete filling of the mold with the melted plastic. After the mold cools, mold portions are separated, and the molded object is ejected.

A plastic with higher flow and lower viscosity sometimes is selected for use in injection molding processes. Non-limiting examples of plastics with higher flow and lower viscosity include any suitable moldable material having one or more of the following properties: a melt flow rate (230 degrees Celsius at 2.16 kg) of about 30 to about 75 grams per 10 minutes using an ASTM D 1238 test method; a tensile strength at yield of about 3900 to about 5000 pounds per square inch using an ASTM D 638 test method; a tensile elongation at yield of about 7 to about 14% using an ASTM D 638 test method; a flexural modulus at 1% sectant of about 110,000 to about 240,000 pounds per square inch using an ASTM D 790 test method; a notched Izod impact strength (23 degrees Celsius) of about 0.4 to about 4.0 foot pounds per inch using an ASTM D 256 test method; and/or a heat deflection temperature (at 0.455 MPa) of about 160 degrees to about 250 degrees Fahrenheit using an ASTM D 648 test method. Non-limiting examples of materials that can be used include polypropylene, polystyrene, polyethylene, polycarbonate, the like, and mixtures thereof. In some embodiments, additional additives can be included in the plastic or mold to impart additional properties to the final product (e.g., anti-microbial, degradable, anti-static properties). A tube and/or cap can be injection molded as a unitary construct.

A mold often is configured to retain molten plastic in a geometry that yields the desired product upon cooling of the plastic. Injection molds sometimes are made of two or more parts. Molds typically are designed so that the molded part reliably remains on the ejector side of the mold after the mold opens, after cooling. The molded part may fall freely away from the mold when ejected from ejector side of the mold. In some embodiments, an ejector sleeve pushes the molded part from the ejector side of the mold.

Methods of Use

A fluid handling tube described herein can be utilized to handle fluids in any suitable manner. In some embodiments, provided are methods of using a fluid handling tube described herein that include: placing a substance in the interior of the tube body of the fluid handling tube; and sealing the sealing member of the cap into the tube body. A substance often is a liquid or contains a liquid. A substance sometimes is a biological fluid or biological substance, sometimes is derived from a biological fluid or substance, and sometimes includes one or more biological substances (e.g., protein, nucleic acid). A substance can be placed into a tube body by any suitable method, including dispensing a fluid substance by a manual or automated pipetting device. In some embodiments, a method includes inserting the fluid handling tube into a centrifuge (e.g., a micro-centrifuge), and sometimes a method includes removing the fluid handling tube from the centrifuge. A method includes, in certain embodiments, unsealing the tubular sealing member of the cap from the tube body, and sometimes includes manipulating the substance in the tube body. Any suitable manipulation can be employed, including adding a fluid or substance, removing a portion or all of the substance from the tube body, or agitating a substance in the tube body, for example. A substance in a tube body can be manipulated when the cap is in sealing attachment with the tube body or the cap is disassociated from the tube body.

EXAMPLES OF EMBODIMENTS

Provided hereafter are non-limiting examples of certain embodiments of the technology.

A1. A fluid handling tube, comprising a tube body and a cap,
which tube body comprises an exterior surface and an interior surface;
which cap comprises a proximal surface, a distal surface and a tubular sealing member protruding from the distal surface; and
which sealing member comprises a distal terminus opposite the distal surface of the cap, an interior surface, and a substantially smooth exterior surface configured to seal with the interior surface of the tube body;
wherein the tube further comprises one or more of the following features (1)-(5):
(1) the interior surface of the sealing member comprises a plurality of longitudinally-oriented grooves and a plurality of longitudinally-oriented panels, wherein each of the grooves is adjacent to one of the panels;
(2) the distal surface of the cap comprises a concave surface surrounded by the tubular sealing member, and the proximal surface of the cap is flat;
(3) the cap comprises an engagement member at an edge of the cap, or the cap comprises an anterior fastener member, wherein the engagement member or the fastener member comprises a surface that includes a radius and a taper;
(4) the tubular sealing member of the cap comprises an annular protrusion, the interior surface of the tube body comprises an annular recess, and the annular recess in the tube body is configured to receive the annular protrusion of the tubular sealing member of the cap; and
(5) the cap comprises an anterior tube fastener member and one or more channels between the sealing member and the fastener member.

B1. The tube of embodiment A1, which interior surface of the sealing member comprises a plurality of longitudinally-oriented panels and a plurality of longitudinally-oriented grooves, wherein each of the panels is adjacent to one of the panels.

B2. The tube of embodiment B1, wherein the grooves and the panels extend to the distal terminus of the sealing member.

B3. The tube of embodiment B1 or B2, wherein each groove comprises a groove floor.

B4. The tube of embodiment B3, wherein the thickness between the groove floor and the exterior surface of the sealing member across from the groove floor is about 0.003 inches to about 0.035 inches.

B5. The tube of any one of embodiments B1-B4, wherein each groove comprises a groove width of about 0.1 inches to about 0.4 inches.

B6. The tube of any one of embodiments B1-B6, wherein each groove comprises a circumferential width of 7 degrees to 11 degrees.

B7. The tube of any one of embodiments B1-B6, wherein each panel comprises a panel sidewall, and a panel width of about 0.06 inches to about 0.1 inches.

B8. The tube of any one of embodiments B1-B7, wherein each panel comprises a circumferential width of 20 degrees to 35 degrees.

B9. The tube of any one of embodiments B1-B8, wherein two or more of the panels are regularly distributed around the interior surface of the sealing member.

B10. The tube of embodiment B1-B9, wherein all of the panels are regularly distributed around the interior surface of the sealing member.

B11. The tube of any one of embodiments B1-B9, wherein two or more of the panels are asymmetrically distributed around the interior surface of the sealing member.

B12. The tube of any one of embodiments B1-B11, wherein two or more of the grooves are regularly distributed around the interior surface of the sealing member.

B13. The tube of embodiment B1-B12, wherein all of the grooves are regularly distributed around the interior surface of the sealing member.

B14. The tube of any one of embodiments B1-B11, wherein two or more of the grooves are asymmetrically distributed around the interior surface of the sealing member.

B15. The tube of any one of embodiments B1-B14, wherein:
the tubular sealing member of the cap is in contact with an interior surface of the tube body and is sealed in the tube body;

the tubular sealing member of the cap is in a compressed state relative to a relaxed state adopted by the tubular sealing member when it is not sealed in the tube body.

C1. The tube of any one of embodiments A1 and B1-B12, wherein the tubular sealing member includes a distal portion, the distal portion comprises a concave curved surface, and the proximal surface of the cap is flat.

C2. The tube of embodiment C1, wherein the distal surface of the cap outside the tubular sealing member is flat.

C3. The tube of embodiment C1 or C2, wherein:
  each panel comprises a panel face and a panel side,
  the panel surface side comprises a curved portion,
  the concave curved surface of the distal portion of the tubular sealing member includes a radius of curvature located at the panel surface side, and
  the curved portion of the panel surface side includes a radius of curvature equal to the radius of curvature of the concave curved surface of the distal portion of the tubular sealing member located at the panel surface side.

C4. The tube of any one of embodiments C1-C3, wherein the radius of curvature of the concave curved surface of the distal portion of the tubular sealing member, at the center point of the tubular sealing member, is about 0.2 inches to about 0.8 inches.

D1. The tube of any one of embodiments A1, B1-B12 and C1-C4, wherein:
  the cap comprises an engagement member at an edge of the cap, or the cap comprises an anterior fastener member, and
  the engagement member or the fastener member comprises an engagement surface that includes a radius and a taper.

D2. The tube of embodiment D1, wherein:
  the engagement member or the fastener member comprises a front wall, a first sidewall and a second sidewall, and
  the first sidewall and the second sidewall are connected to the front wall on each side of the front wall.

D2. The tube of embodiment D1, wherein:
  the engagement member comprises a front wall, a first sidewall and a second sidewall, and
  the first sidewall and the second sidewall are connected to the front wall on each side of the front wall.

D3. The tube of embodiment D2, wherein the front wall comprises a concave curved surface curving from the first sidewall to the second sidewall.

D4. The tube of embodiment D1, wherein:
  the fastener member comprises a front wall, a first sidewall and a second sidewall, and
  the first sidewall and the second sidewall are connected to the engagement surface on each side of the engagement surface.

D5. The tube of embodiment D4, wherein the engagement surface comprises a concave curved surface curving from the first sidewall to the second sidewall.

D6. The tube of embodiment D3 or D5, wherein the curved surface has a radius of curvature of about 0.3 inches to about 0.7 inches.

D7. The tube of any one of embodiments D1-D3 and D6, wherein the front wall tapers from a proximal terminus of the front wall to a distal terminus of the front wall.

D8. The tube of embodiment D7, wherein the front wall has a taper angle of about 50 degrees to about 60 degrees with respect to a longitudinal axis.

D9. The tube of any one of embodiments D1 and D4-D6, wherein the engagement surface tapers from a proximal terminus of the engagement surface to a distal terminus of the engagement surface.

D10. The tube of embodiment D9, wherein the engagement surface has a taper angle of about 50 degrees to about 60 degrees with respect to a longitudinal axis.

E1. The tube of any one of embodiments A1, B1-B12, C1-C4, and D1-D10, wherein:
  the tubular sealing member of the cap comprises an annular protrusion,
  the interior surface of the tube body comprises an annular recess, and
  the annular recess in the tube body is configured to receive the annular protrusion of the tubular sealing member of the cap.

E2. The tube of embodiment E1, wherein:
  the tubular sealing member of the cap is in contact with an interior surface of the tube body and is sealed in the tube body; and
  the annular protrusion and the annular recess are in a sealing zone.

F1. The tube of any one of embodiments A1, B1-B12, C1-C4, D1-D10 and E1-E2, wherein the cap comprises an anterior tube fastener member and one or more channels between the sealing member and the fastener member.

F2. The tube of embodiment F1, wherein:
  the one or more channels define two regions of a cap,
  a first region including a tube fastener member of the cap located on the anterior side of the one or more channels, and
  a second region including a cap body located on the posterior side of the one or more channels.

F3. The tube of embodiment F1 or F2, wherein the fastener member comprises an operator engagement surface.

F4. The tube of any one of embodiments F1-F3, wherein the channel comprises a latitudinal opening.

F5. The tube of embodiment F4, wherein the latitudinal opening is disposed on the proximal surface of the cap.

F6. The tube of embodiment F4 or F5, wherein the latitudinal opening is disposed on the distal surface of the cap.

F7. The tube of any one of embodiments F1-F6, wherein the channel does not span the entire width of a cap and does not terminate at a cap rim exterior surface.

F8. The tube of any one of embodiments F1-F6, wherein the channel terminates at a cap rim exterior surface.

F9. The tube of any one of embodiments F1-F8, wherein the cap comprises a bore.

F10. The tube of embodiment F9, wherein the channel terminates at a bore interior side surface.

F11. The tube of any one of embodiments F1-F10, wherein the cap comprises two channels F12. The tube of embodiment F11, wherein the channels are parallel to one another.

F13. The tube of embodiment F11 or F12, wherein the channels are co-linear.

F14. The tube of any one of embodiments F11-F13, wherein the cap comprises a bore and two co-linear channels, where each channel is disposed on each side of the bore.

F15. The tube of any one of embodiments F1-F14, wherein the channel comprises a channel floor, a first channel terminus, a second channel terminus, and a major length along the channel floor from the first channel terminus to the second channel terminus.

F16. The tube of embodiment F15, wherein the major length of the channel, or of each channel, is parallel to a latitudinal axis extending from one side of the cap to the other side of the cap and parallel to the major length of the junction between tether and cap to tether connector.

F17. The tube of embodiment F15 or F16, wherein a channel terminus has a u-shaped or v-shaped cross section with flat sidewalls, flat floor, curved sidewalls, curved floor, or combination thereof.

F18. The tube of any one of embodiments F15-F17, wherein the channel has a depth from the channel floor to the channel opening.

F19. The tube of embodiment F18, wherein the channel depth is about 0.025 inches to about 0.035 inches.

F20. The tube of any one of embodiments F3-F19, wherein an angle between the engagement surface and a longitudinal axis is about 45 degrees to about 65 degrees when the cap is in sealing connection with the tube body.

F21. The tube of embodiment F20, wherein the angle is about 50 degrees to about 60 degrees.

F22. The tube of embodiment F21, wherein the angle is about 55 degrees.

F23. The tube of any one of embodiments F1-F22, wherein the engagement surface comprises a textured surface.

F24. The tube of embodiment F23, wherein the textured surface comprises ridges and troughs.

F25. The tube of any one of embodiments F1-F24, wherein the one or more channels in the cap are configured to function as a living hinge between the tube fastener member and the cap body when a force is applied to the engagement surface in the proximal direction.

F26. The tube of any one of embodiments F1-F25, wherein the one or more channels in the cap are configured to reduce the angle between the engagement surface and a longitudinal axis after and when a force is applied to the engagement surface, compared to the angle before the force is applied.

F27. The tube of embodiment F26, wherein the angle is reduced by about 5 degrees to about 12 degrees after and when the force is applied.

F28. The tube of any one of embodiments F1-F27, wherein the one or more channels in the cap are configured to reduce the minor width of the channel at the channel opening after and when the force is applied compared to the minor width of the opening of the channel before the force is applied.

F29. The tube of embodiment F28, wherein the minor width of the opening of the channel is about 0.020 inches to about 0.030 inches before the force is applied and the minor width of the opening of the channel is reduced by about 0.003 inches to about 0.006 inches after and when the force is applied.

F30. The tube of any one of embodiments F1-F29, wherein the cap distal surface and the distal surface of the cap rim (i) are flat or substantially flat before the force is applied, and (ii) deform from the flat or substantially flat orientation to a curved orientation after and when the force is applied to the engagement surface of the tube fastener member in the cap.

F31. The tube of any one of embodiments F1-F30, wherein the floor of the channel along the major length of the channel is configured to function as a flex point and pivot at which the channel anterior sidewall, or both channel walls swing or rotate.

F32. The tube of embodiment F31, wherein:
the flex point permits the tube fastener member of the cap to pivot outwards, and
rotation of the tube fastener member, with respect to the cap body, at the flex point in the channel, disassociates the fastener in the cap from the fastener engagement surface on the tube.

F33. The tube of any one of embodiments F1-F32, wherein the one or more channels reduces the amount of force required to disassociate the fastener in the cap from the fastener engagement surface on the tube, compared to the force required for this disassociation for a cap that does not include the one or more channels.

F34. The tube of any one of embodiments F1-F36, wherein the thickness of material between the channel floor and a surface of the cap opposite the channel floor is about 0.003 inches to about 0.011 inches.

F35. The tube of embodiment F34, wherein the thickness of the material is about 0.005 inches to about 0.009 inches.

F36. The tube of embodiment F35, wherein the thickness of the material is about 0.007 inches.

G1. The tube of any one of embodiments A1, B1-B12, C1-C4, D1-D10, E1-E2, and F1-F36, wherein the tube body comprises circumferentially disposed ribs.

G2. The tube of embodiment G1, wherein the tube body comprises a rim disposed at the proximal terminus of the tube body, and the ribs contact a distal surface of the rim.

G3. The tube of embodiment G1 or G2, wherein the cap is engaged with the tube body with the sealing member of the cap in contact with an interior surface of the tube body, and each of the ribs is disposed across from a groove.

G4. The tube of any one of embodiments G1-G3, comprising fasteners.

G5. The tube of embodiment G4, wherein the cap comprises a fastener and the tube body comprises a fastener counterpart.

G6. The tube of embodiment G5, wherein the fastener of the cap extends from the rear of the engagement member front wall.

G7. The tube of embodiment G6, wherein the fastener of the cap comprises a protrusion.

G8. The tube of embodiment G7, wherein the fastener of the cap comprises a latch.

G9. The tube of embodiment G7, wherein the fastener of the cap comprises a support member extending from the protrusion.

G10. The tube of any one of embodiments G4-G9, wherein the fastener of the cap comprises a protrusion that contacts a surface of the fastener of the tube body.

G11. The tube of any one of embodiments G4-G10, comprising a bore in the cap extending from the proximal surface to the distal surface, wherein the bore is adjacent to the fastener of the cap.

G12. The tube of embodiment G11, wherein a portion of the bore extends from the rear of the engagement member front wall.

G13. The tube of embodiment G11, wherein the bore extends through a portion of the cap body and through a portion of the fastener member from the proximal surface of the cap to the distal surface of the cap.

G14. The tube of any one of embodiments G1-G13, comprising a tether connected to the cap and the tube body.

G15. The tube of embodiment G14, wherein the tether comprises a cap to tether connector and a tube to tether connector.

G16. The tube of any one of embodiments G1 to G15, comprising a polymer.

G17. The tube of embodiment G16, wherein the tube is manufactured from a polymer or polymer mixture.

G18. The tube of embodiment G16 or G17, wherein the polymer is chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE).

G19. The tube of any one of embodiments G1-G18, comprising volumetric graduations on the exterior surface of the tube body.

G20. The tube of any one of embodiments G1-G18, with the proviso that the tube body includes no volumetric graduations.

H1. A method for manufacturing a tube, comprising:
  contacting a mold comprising an interior cavity configured to mold a tube of any one of embodiments A1, B1-B12, C1-C4, D1-D10, E1-E2, F1-F36, and G1-G20, with a molten polymer;
  hardening the polymer in the mold, thereby forming the tube in the mold; and
  ejecting the tube from the mold.

H2. The method of embodiment H1, wherein the mold comprises a metal.

H3. The method of embodiment H2, wherein the mold is manufactured from a metal.

H4. The method of embodiment H2 or H3, wherein the metal is chosen from aluminum, zinc, steel and a steel alloy.

H5. The method of any one of embodiments H1 to H4, wherein the polymer is chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE).

I1. A mold configured to form a tube of any one of embodiments A1, B1-B12, C1-C4, D1-D10, E1-E2, F1-F36, and G1-G20, by a molding process.

I2. The mold of embodiment I1, wherein the mold comprises a metal.

I3. The mold of embodiment I2, wherein the mold is manufactured from a metal.

I4. The mold of embodiment I2 or I3, wherein the metal is chosen from aluminum, zinc, steel and a steel alloy.

I5. The mold of any one of embodiments I1-I4, wherein the molding process is an injection molding process.

J1. A method of using a tube of any one of embodiments A1, B1-B12, C1-C4, D1-D10, E1-E2, F1-F36, and G1-G20, comprising:
  placing a substance in the interior of the tube body of the tube; and
  sealing the tubular sealing member of the cap into the tube body.

J2. The method of embodiment J1, comprising inserting the tube into a centrifuge.

J3. The method of embodiment J2, comprising removing the tube from the centrifuge.

J4. The method of any one of embodiments J1-J4, comprising unsealing the tubular sealing member of the cap from the tube body.

J5. The method of embodiment J4, comprising manipulating the substance in the tube.

J6. The method of any one of embodiments J1-J5, wherein the substance comprises a fluid.

J7. The method of embodiment J6, wherein the fluid comprises a biological fluid.

K1. A method for dissociating a fastener disposed on a cap from a fastener counterpart disposed on a tube body of a fluid handling tube, comprising:
  providing a fluid handling tube comprising a tube body and a cap,
    which tube body comprises an exterior surface and an interior surface,
    which cap comprises a proximal surface, a distal surface and a tubular sealing member protruding from the distal surface,
    which sealing member comprises a distal terminus opposite the distal surface of the cap, an interior surface, and a substantially smooth exterior surface configured to seal with the interior surface of the tube body,
    which cap comprises an anterior tube fastener member and one or more channels between the sealing member and the fastener member,
    which fastener member comprises an engagement surface and a fastener, and
    which tube body comprises a fastener counterpart; and
  applying a force in a proximal direction to the engagement surface in an amount sufficient to disengage the fastener disposed on the fastener member of the cap from the fastener counterpart disposed on the tube body.

K2. The method of embodiment K1, wherein:
  the one or more channels define two regions of a cap,
  a first region including the tube fastener member of the cap located on the anterior side of the one or more channels, and
  a second region including a cap body located on the posterior side of the one or more channels.

K3. The method of embodiment K1 or K2, wherein the fastener member comprises an operator engagement surface.

K4. The method of any one of embodiments K1-K3, wherein the channel comprises a latitudinal opening.

K5. The method of embodiment K4, wherein the latitudinal opening is disposed on the proximal surface of the cap.

K6. The method of embodiment K4 or K5, wherein the latitudinal opening is disposed on the distal surface of the cap.

K7. The method of any one of embodiments K1-K6, wherein the channel does not span the entire width of a cap and does not terminate at a cap rim exterior surface.

K8. The method of any one of embodiments K1-K6, wherein the channel terminates at a cap rim exterior surface.

K9. The method of any one of embodiments K1-K8, wherein the cap comprises a bore.

K10. The method of embodiment K9, wherein the channel terminates at a bore interior side surface.

K11. The method of any one of embodiments K1-K10, wherein the cap comprises two channels K12. The method of embodiment K11, wherein the channels are parallel to one another.

K13. The method of embodiment K11 or K12, wherein the channels are co-linear.

K14. The method of any one of embodiments K11-K13, wherein the cap comprises a bore and two co-linear channels, where each channel is disposed on each side of the bore.

K15. The method of any one of embodiments K1-K14, wherein the channel comprises a channel floor, a first channel terminus, a second channel terminus, and a major length along the channel floor from the first channel terminus to the second channel terminus.

K16. The method of embodiment K15, wherein the major length of the channel, or of each channel, is parallel to a latitudinal axis extending from one side of the cap to the other side of the cap and parallel to the major length of the junction between tether and cap to tether connector.

K17. The method of embodiment K15 or K16, wherein a channel terminus has a u-shaped or v-shaped cross section with flat sidewalls, flat floor, curved sidewalls, curved floor, or combination thereof.

K18. The method of any one of embodiments K15-K17, wherein the channel has a depth from the channel floor to the channel opening.

K19. The method of embodiment K18, wherein the channel depth is about 0.025 inches to about 0.035 inches.

K20. The method of any one of embodiments K3-K19, wherein an angle between the engagement surface and a longitudinal axis is about 45 degrees to about 65 degrees when the cap is in sealing connection with the tube body.

K21. The method of embodiment K20, wherein the angle is about 50 degrees to about 60 degrees.

K22. The method of embodiment K21, wherein the angle is about 55 degrees.

K23. The method of any one of embodiments K1-K22, wherein the engagement surface comprises a textured surface.

K24. The method of embodiment K23, wherein the textured surface comprises ridges and troughs.

K25. The method of any one of embodiments K1-K24, wherein the one or more channels in the cap are configured to function as a living hinge between the tube fastener member and the cap body when the force is applied to the engagement surface.

K26. The method of any one of embodiments K1-K25, wherein the angle between the engagement surface and a longitudinal axis reduces after and when a force is applied to the engagement surface, compared to the angle before the force is applied.

K27. The method of embodiment K26, wherein the angle reduces by about 5 degrees to about 12 degrees after and when the force is applied.

K28. The method of any one of embodiments K1-K27, wherein the minor width of the channel at the channel opening reduces after and when the force is applied compared to the minor width of the opening of the channel before the force is applied.

K29. The method of embodiment K28, wherein the minor width of the opening of the channel is about 0.020 inches to about 0.030 inches before the force is applied and the minor width of the opening of the channel is reduced by about 0.003 inches to about 0.006 inches after and when the force is applied.

K30. The method of any one of embodiments K1-K29, wherein the cap distal surface and the distal surface of the cap rim (i) are flat or substantially flat before the force is applied, and (ii) deform from the flat or substantially flat orientation to a curved orientation after and when the force is applied to the engagement surface of the tube fastener member in the cap.

K31. The method of any one of embodiments K1-K30, wherein the channel anterior sidewall, or both channel walls, swing or rotate at a flex point spanning the floor of the channel along the major length of the channel after and when the force is applied.

K32. The method of embodiment K31, wherein:
the tube fastener member of the cap pivots outwards, and
the tube fastener member rotates, with respect to the cap body, at the flex point in the channel,
thereby disassociating the fastener disposed on the fastener member of the cap from the fastener counterpart disposed on the tube after and when the force is applied.

K33. The method of any one of embodiments K1-K32, wherein the one or more channels reduces the amount of force required to disassociate the fastener disposed on the fastener member of the cap from the fastener counterpart disposed on the tube, compared to the force required for this disassociation for a cap that does not include the one or more channels.

K34. The method of any one of embodiments K1-K32, wherein the fastener counterpart disposed on the tube body is a fastener engagement surface.

K35. The method of any one of embodiments K1-K33, wherein the thickness of material between the channel floor and a surface of the cap opposite the channel floor is about 0.003 inches to about 0.011 inches.

K36. The method of embodiment K35, wherein the thickness of the material is about 0.005 inches to about 0.009 inches.

K37. The method of embodiment K36, wherein the thickness of the material is about 0.007 inches.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A fluid handling tube, comprising a tube body and a cap, wherein:
the tube body comprises an exterior surface and an interior surface;
the cap comprises a proximal surface, a distal surface, a rim, a rim exterior surface, and a tubular sealing member protruding from the distal surface;
the sealing member comprises a distal terminus opposite the distal surface of the cap, an interior surface, and a substantially smooth exterior surface configured to seal with the interior surface of the tube body;
the cap comprises an anterior tube fastener member comprising an operator engagement surface;
the cap comprises a bore, which bore comprises a first bore interior side surface and an opposing second bore interior side surface;
the cap comprises two co-linear channels disposed on each side of the bore and disposed between the sealing member and the fastener member;
each of the channels comprises:
a latitudinal opening disposed on the proximal surface of the cap;
a channel floor;
a first channel terminus disposed at a rim exterior surface;
a second channel terminus disposed at the first bore interior side surface or the second bore interior side surface; and
a major length along the channel floor from the first channel terminus to the second channel terminus;
the fastener member of the cap comprises a protrusion configured to contact a surface of a fastener member counterpart of the tube body and releasably attach to the fastener member counterpart; and
the channels reduce the amount of force required for disassociation of the protrusion and the fastener member counterpart of the tube body, compared to the force required for the disassociation for a cap that does not include the channels.

2. The tube of claim 1, wherein the first channel terminus, or the second channel terminus, or the first channel terminus and the second channel terminus, of the channels has a u-shaped or v-shaped cross section with flat sidewalls, flat floor, curved sidewalls, curved floor, or combination thereof.

3. The tube of claim 1, wherein each of the channels comprises a channel depth from the channel floor to the channel opening, which channel depth is about 0.025 inches to about 0.035 inches.

4. The tube of claim 1, wherein the thickness between the channel floor and the distal surface of the cap opposite the channel floor is about 0.003 inches to about 0.011 inches.

5. The tube of claim 4, wherein the thickness is about 0.005 inches to about 0.009 inches.

6. The tube of claim 5, wherein the thickness is about 0.007 inches.

7. The tube of claim 1, wherein the operator engagement surface comprises a radius and a taper.

8. The tube of claim 7, wherein:
the fastener member comprises a front wall, a first sidewall and a second sidewall, and
the first sidewall and the second sidewall are connected to the operator engagement surface on each side of the operator engagement surface.

9. The tube of claim 8, wherein the operator engagement surface comprises a concave curved surface curving from the first sidewall to the second sidewall.

10. The tube of claim 9, wherein the curved surface has a radius of curvature of about 0.3 inches to about 0.7 inches.

11. The tube of claim 7, wherein the operator engagement surface comprises a proximal terminus and a distal terminus and the operator engagement surface tapers from the proximal terminus to the distal terminus.

12. The tube of claim 11, wherein the operator engagement surface has a taper angle of about 45 degrees to about 65 degrees with respect to a longitudinal axis when the cap is in sealing connection with the tube body.

13. The tube of claim 12, wherein the taper angle is about 50 degrees to about 60 degrees with respect to the longitudinal axis.

14. The tube of claim 13, wherein the taper angle is about 55 degrees with respect to the longitudinal axis.

15. The tube of claim 1, wherein the operator engagement surface comprises a textured surface.

16. The tube of claim 15, wherein the textured surface comprises ridges and troughs.

17. The tube of claim 1, wherein each of the channels in the cap is a living hinge.

18. The tube of claim 17, wherein each of the channels in the cap functions as a living hinge when a force is applied to the operator engagement surface in a proximal direction.

19. The tube of claim 18, wherein the cap is configured to deform, whereby the cap distal surface and the distal surface of the cap rim (i) are flat or substantially flat before the force is applied, and (ii) deform from the flat or substantially flat orientation to a curved orientation after and when the force is applied to the operator engagement surface of the tube fastener member in the cap.

20. The tube of claim 19, wherein the minor width of the opening of each of the channels is about 0.020 inches to about 0.030 inches before the force is applied and the minor width of the opening of the channel is reduced by about 0.003 inches to about 0.006 inches after and when the force is applied.

* * * * *